US008908573B1

(12) United States Patent
Wang et al.

(10) Patent No.: US 8,908,573 B1
(45) Date of Patent: Dec. 9, 2014

(54) DATA COMMUNICATION SYSTEMS AND METHODS

(71) Applicant: SZ DJI Technology Co., Ltd, Shenzhen, Guangdong (CN)

(72) Inventors: Tao Wang, Shenzhen (CN); Zhongqian You, Shenzhen (CN)

(73) Assignee: SZ DJI Technology Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 14/169,011

(22) Filed: Jan. 30, 2014

Related U.S. Application Data

(63) Continuation of application No. PCT/CN2014/070605, filed on Jan. 14, 2014.

(30) Foreign Application Priority Data

Sep. 26, 2013 (CN) .......................... 2013 1 0446701

(51) Int. Cl.
H04J 3/00 (2006.01)
H04L 5/26 (2006.01)
H04L 5/00 (2006.01)

(52) U.S. Cl.
CPC . *H04L 5/26* (2013.01); *H04L 5/003* (2013.01)
USPC ........................................................ 370/280

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 5,991,286 | A | 11/1999 | Labonte et al. | |
|---|---|---|---|---|
| 8,135,338 | B1* | 3/2012 | Gelon et al. | 455/13.1 |
| 8,335,196 | B2 | 12/2012 | Das et al. | |
| 2004/0147287 | A1* | 7/2004 | Nelson et al. | 455/561 |
| 2009/0046605 | A1 | 2/2009 | Gao et al. | |
| 2012/0155562 | A1* | 6/2012 | Lucidarme | 375/267 |
| 2013/0336174 | A1* | 12/2013 | Rubin et al. | 370/280 |

FOREIGN PATENT DOCUMENTS

| CN | 1596548 A | 3/2005 |
|---|---|---|
| CN | 1968446 A | 5/2007 |
| CN | 101123472 A | 2/2008 |
| CN | 101445156 A | 6/2009 |
| CN | 101515163 A | 8/2009 |
| CN | 101742560 A | 6/2010 |
| CN | 102036301 A | 4/2011 |
| CN | 103490842 A | 1/2014 |

OTHER PUBLICATIONS

International search report dated Jun. 27, 2014 for PCT/CN2014/071938.

* cited by examiner

*Primary Examiner* — Jung-Jen Liu
(74) *Attorney, Agent, or Firm* — Wilson Sonsini Goodrich & Rosati

(57) ABSTRACT

The present invention provides systems and methods for improved data communication between communication terminals such as a base station and an unmanned aerial vehicle. In some instances, the systems and methods described herein provide robust transmission uplink data such as control data and wideband transmission of downlink data such as image data or other sensor data, while avoiding interference between the uplink data transmission and the downlink transmission.

24 Claims, 16 Drawing Sheets

| Subframe(s) / guard interval | Time | Modulation Method | Description |
| --- | --- | --- | --- |
| T1 | 0.25ms | FSK | Uplink data transmission |
| TG1 | 150us | None | Guard interval |
| T2 | 0.25ms | None | Channel measurement |
| TG2 | 150us | None | Guard interval |
| T3-T19 | 4ms | QPSK, 16QAM, 64QAM, 256QAM | Downlink data transmission |
| TG3 | 200us | None | Interframe gap |

FIG. 5

| Subframe(s) / guard interval | Time | Modulation Method | Description |
|---|---|---|---|
| T1 | 0.25ms | None | Channel measurement |
| TG1 | 150us | None | Guard interval |
| T2 | 0.25ms | FSK | Uplink data transmission |
| TG2 | 150us | None | Guard interval |
| T3-T19 | 4ms | QPSK, 16QAM, 64QAM, 256QAM | Downlink data transmission |
| TG3 | 200us | None | Interframe gap |

FIG. 6

DATA COMMUNICATION SYSTEMS AND METHODS

CROSS-REFERENCE

This application is a continuation of International Application No. PCT/CN2014/070605, filed on Jan. 14, 2014, which claims priority from Chinese Patent Application No. 201310446701.3, filed on Sep. 26, 2013. The above-referenced applications are hereby incorporated by reference.

BACKGROUND OF THE INVENTION

Modern unmanned aerial vehicles (UAVs), with their small sizes and flexibility, have become widely used in a variety of military and civilian applications such as surveillance and tracking, remote sensing, search and rescue, scientific research and the like. UAVs are typically controlled wirelessly by remote control equipments and/or by onboard control programs via communication links and the performance of such communication links can have a direct impact on the safety and effectiveness of the UAV's missions.

Depending on the direction of the data transmission, UAV communication links can be generally categorized as uplinks and downlinks. An uplink is primarily responsible for the transmission of control data from a base station or a remote control device to the UAV, for example, to achieve real-time flight attitude control of the UAV and/or command automation. The downlink, on the other hand, is primarily responsible for the transmission of telemetry data, image data and other data from the UAV to the base station or remote control device.

Currently, the transmission of image data and the transmission control data are typically implemented by independent systems. That is, the base station and the UAV are each provided with two independent sets of devices, one for remote control and the other for image transmission. The two systems can work simultaneously on the same public channel to achieve respective remote control and image transmission functionalities. However, two separate sets of equipment can take up a large amount of space, affecting portability and increasing cost.

Furthermore, when operated simultaneously, the image transmission system and the remote control systems can interfere with each other, affecting the stability of the remote control system and reducing the effective distance for remote control. The interference can also cause decline in the quality of image transmission, reducing the effective distance for image transmission. Meanwhile, both the image transmission system and remote control system can be susceptible to interference from other sources, further degrading the performance.

SUMMARY OF THE INVENTION

A need exists for improved data communication between communication terminals. The present invention provides systems and methods for data communication between communication terminals. In some embodiments, the systems and methods described herein provide robust uplink data transmission and wideband downlink data transmission while avoiding interference between the uplink data transmission and the downlink transmission.

According to an aspect of the present invention, a method for wireless communication between a first terminal and a second terminal is provided using a plurality of cyclically repeating time division multiplexing (TDM) frames, each comprising a plurality of subframes. The method comprises transferring, at a first data bandwidth, uplink data from the first terminal to the second terminal while using a first subset of the plurality of subframes, the uplink data encoded using a first coding scheme; and transferring, at a second data bandwidth that is different than the first data bandwidth, downlink data from the second terminal to the first terminal while using a second subset of the plurality of subframes, the downlink data encoded using a second coding scheme, the second coding scheme being different than the first coding scheme.

According to another aspect of the present invention, another method for wireless communication between a first terminal and a second terminal is provided using a plurality of cyclically repeating time division multiplexing (TDM) frames, each comprising a plurality of subframes. The method comprises transferring, at a first data bandwidth, uplink data from the first terminal to the second terminal while using a first subset of the plurality of subframes, the uplink data modulated using a first modulation scheme; and transferring, at a second data bandwidth that is different than the first data bandwidth, downlink data from the second terminal to the first terminal while using a second subset of the plurality of subframes, the downlink data modulated using a second modulation scheme, the second modulation scheme being different than the first modulation scheme.

According to another aspect of the present invention, another method for wireless communication between a first terminal and a second terminal is provided using a plurality of cyclically repeating TDM frames, each comprising a plurality of subframes. The method comprises transferring uplink data from the first terminal to the second terminal while using a first subset of the plurality of subframes; measuring channel quality associated with one or more channels, while using a second subset of the plurality of subframes, to select a working frequency; and transferring, using the working frequency, downlink data from the second terminal to the first terminal while using a third subset of the plurality of subframes.

According to another aspect of the present invention, another method for wireless communication between a first terminal and a second terminal is provided using a plurality of cyclically repeating TDM frames, each comprising a plurality of subframes. The method comprises transferring uplink data from the first terminal to the second terminal while using a first subset of the plurality of subframes, the uplink data comprising synchronization information useful for synchronizing operations of the first terminal and the second terminal and the uplink data modulated using a first modulation scheme; and transferring downlink data from the second terminal to the first terminal while using a second subset of the plurality of subframes, the downlink data modulated using a second modulation scheme being different than the first modulation scheme.

According to another aspect of the present invention, another method for wireless communication between a remote terminal and a communication module of a vehicle is provided, said vehicle comprising a sensor, and said wireless communication using a plurality of cyclically repeating TDM frames, each TDM frame comprising a plurality of subframes. The method comprises transferring uplink data from the remote terminal to the communication module of the vehicle while using a first subset of the plurality of subframes; and transferring downlink data that includes data from the sensor, from the communication module of the vehicle to the remote terminal while using a second subset of the plurality of subframes, wherein a number of subframes in the second subset is greater than a number of subframes in the first subset.

According to another aspect of the present invention, a data communication system is provided. The data communication system comprises a first terminal comprising a uplink transmitter and a downlink receiver; and a second terminal comprising an uplink receiver and a downlink transmitter, wherein the uplink transmitter is configured to transmit uplink data to the second terminal in a first time slot; the downlink receiver is configured to measure, in a second time slot, channel quality associated with one or more channels to select to a working frequency and to receive, using the working frequency, downlink data provided by the second terminal in a third time slot; the uplink receiver is configured to receive the uplink data in the first time slot; and the downlink transmitter is configured to transmit, using the working frequency, the downlink data in the third time slot.

In some or all of the methods and/or systems described herein, the first terminal can include at least one of a base station or a remote control device. The second terminal can include a mobile platform. The mobile platform can include an unmanned aerial vehicle (UAV).

In some or all of the methods and/or systems described herein, the uplink data can include synchronization information usable for synchronizing operations of the first terminal and the second terminal. The uplink data can include control data for controlling operations of the second terminal.

In some or all of the methods and/or systems described herein, the downlink data can include information collected by the second terminal. The information collected by the second terminal can include image data acquired by a visual sensor associated with the second terminal.

In some or all of the methods and/or systems described herein, the uplink data can be transferred using a first frequency channel with a first channel bandwidth and the downlink data can be transferred using a second frequency channel with a second channel bandwidth that is wider than the first channel bandwidth.

Some or all of the methods described herein can further comprise dynamically changing the first channel bandwidth or the second channel bandwidth based at least in part on one or more channel conditions.

Some or all of the methods described herein can further comprise selecting, from a plurality of channels, a working frequency based at least in part on one or more channel characteristics associated with the plurality of available channels and wherein the downlink data is transferred using the selected working frequency. The one or more channel characteristics can include at least one of noise, interference, signal-to-noise ratio (SNR), bit error rate, or fading rate. The uplink data can include information about the working frequency.

Some or all of the methods described herein can further comprise in response to determining that transfer of the downlink data is not successful, re-transferring the downlink data from the second terminal to the first terminal. Likewise, some or all of the methods described herein can further comprise in response to determining that transfer of the uplink data is not successful, allowing only the transfer of the uplink data.

In some or all of the methods and/or systems described herein, the first modulation scheme can include at least one of Direct Sequence Spread Spectrum (DSSS), Frequency Hopping Spread Spectrum (FHSS), or Frequency Shift Keying (FSK). The second modulation scheme can include Quadrature Amplitude Modulation (QAM).

In some or all of the methods and/or systems described herein, the first modulation scheme can include a single-carrier modulation scheme and wherein the second modulation scheme can include a multi-carrier modulation scheme. The second modulation scheme can be higher-order than the first modulation scheme.

In some or all of the methods and/or systems described herein, the downlink data can be encoded with a high-efficiency coding scheme. The high-efficiency coding scheme can include Low Density Parity Check Code (LDPC). The second coding scheme can be more efficient than the first coding scheme.

Some or all of the methods described herein can further comprise dynamically changing the first modulation scheme or the second modulation scheme based at least in part on one or more channel conditions.

Some or all of the methods described herein can further comprise dynamically changing the first coding scheme or the second coding scheme based at least in part on one or more channel conditions.

In some or all of the methods and/or systems described herein, measuring channel quality can include measuring one or more characteristics associated with each of the one or more channels. The one or more characteristics can include at least one of noise, interference, signal-to-noise ratio (SNR), bit error rate, or fading rate.

Some or all of the methods described herein can further comprise dynamically allocating the first subset of the plurality of subframes and the second subset of the plurality of subframes based at least in part on one or more channel conditions.

In some or all of the methods and/or systems described herein, the first time slot, the second time slot and the third time slot each can include one or more time division multiplexing (TDM) subframes. The uplink data can include timing information for the first time slot, the second time slot and the third time slot.

In some or all of the methods and/or systems described herein, the uplink transmitter of the first terminal can be further configured to transmit synchronization information to the downlink receiver of the first terminal. The uplink receiver of the second terminal can be further configured to acquire the timing information for the first time slot, the second time slot and the third time slot and to provide the timing information to the downlink transmitter. The synchronization information can be substantially similar to the timing information In some or all of the methods and/or systems described herein, the downlink receiver can be further configured to provide the working frequency information related to the working frequency to the uplink transmitter and the uplink transmitter is further configured to transmit the working frequency information. The uplink receiver can be further configured to receive the working frequency information and to provide the working frequency information to the downlink transmitter and wherein the downlink transmitter can be further configured to transmit the working frequency information.

In some or all of the methods and/or systems described herein, the downlink transmitter can be further configured to encode the downlink using a coding scheme before transmitting the downlink data and the downlink receiver can be further configured to receive the encoded downlink data and to decode the received downlink data using a decoding scheme that corresponds to the coding scheme. The downlink receiver can be further configured to measure quality of the downlink data and to provide a measurement result to the uplink transmitter and the uplink transmitter can be further configured to transmit the measurement result. The uplink receiver can be further configured to receive the measurement result and provide the measurement result to the downlink transmitter and the downlink transmitter can be further configured to determine whether to change the current coding scheme based at least in part on the measurement result and the current coding scheme and in response to a determination that the current coding scheme need to be changed, change the current coding scheme to an updated coding scheme, encode the downlink data with the updated coding scheme and transmit the encoded downlink data. The downlink receiver can be further configured to receive the downlink data encoded using the updated coding scheme and to decode the downlink data using an updated decoding scheme that corresponds to the updated coding scheme.

It shall be understood that different aspects of the invention can be appreciated individually, collectively, or in combination with each other. Various aspects of the invention described herein may be applied to any of the particular applications set forth below or data communication between any other types of movable and/or stationary objects.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 5 illustrates an exemplary configuration of the TDM frame shown in FIG. 4, in accordance with an embodiment.

FIG. 6 illustrates another exemplary configuration of the TDM frame shown in FIG. 4, in accordance with an embodiment.

DETAILED DESCRIPTION OF THE INVENTION

Figure 1:
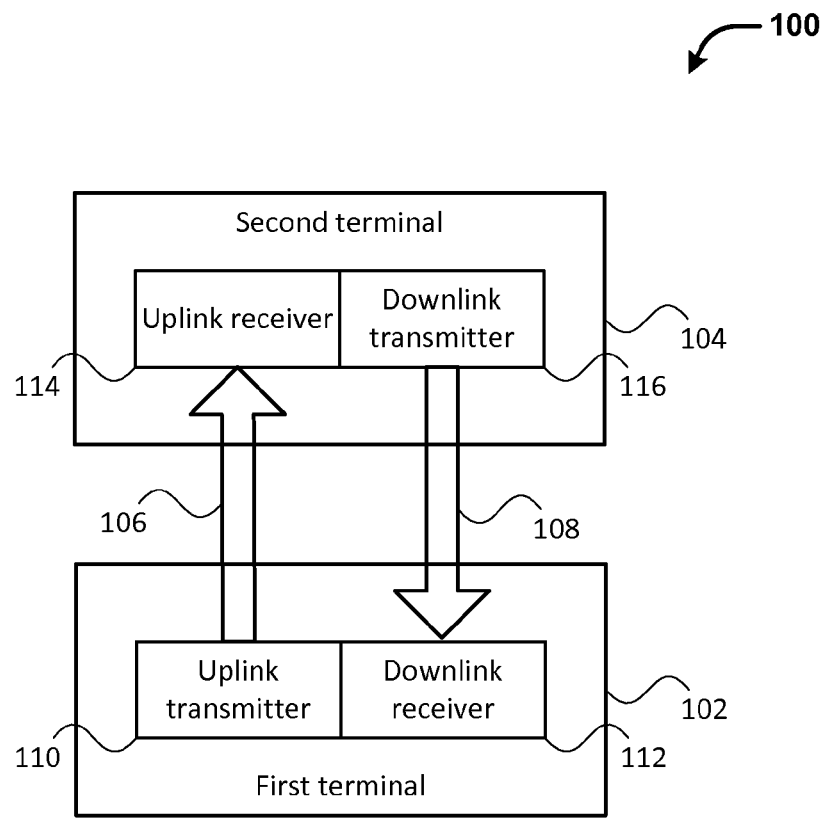
FIG. 1 illustrates an exemplary communication system for implementing aspects of the present invention, according to an embodiment.

The present invention provides systems and methods for improved data communication between communication terminals. In some embodiments, the systems and methods described herein provide robust uplink data transmission and wideband downlink data transmission while avoiding interference between the uplink data transmission and the downlink transmission.

To avoid interference between the uplink and downlink data communications, a time-division multiplexing (TDM) mode of communication is used where the uplink and the downlink share the same communication channel in non-overlapping time slots. To ensure robust uplink and wideband downlink, different coding and/or modulation schemes are used to encode and/or modulate the uplink data and the downlink data. The disclosed systems and methods can be applied to data communication between a base station or a control device and a remotely-controlled object or device such as an unmanned aerial vehicle (UAV). For example, the robust uplink can be used to transmit control data from the base station to the UAV whereas the wideband downlink can be used to transmit image data or other sensor data from the UAV to the base station.

According to an aspect of the present invention, a method for wireless communication between a first terminal and a second terminal is provided using a plurality of cyclically repeating TDM frames, each comprising a plurality of subframes. The method comprises transferring, at a first data bandwidth, uplink data from the first terminal to the second terminal while using a first subset of the plurality of subframes, the uplink data encoded using a first coding scheme; and transferring, at a second data bandwidth that is different than the first data bandwidth, downlink data from the second terminal to the first terminal while using a second subset of the plurality of subframes, the downlink data encoded using a second coding scheme, the second coding scheme being different than the first coding scheme.

According to another aspect of the present invention, another method for wireless communication between a first terminal and a second terminal is provided using a plurality of cyclically repeating TDM frames, each comprising a plurality of subframes. The method comprises transferring, at a first data bandwidth, uplink data from the first terminal to the second terminal while using a first subset of the plurality of subframes, the uplink data modulated using a first modulation scheme; and transferring, at a second data bandwidth that is different than the first data bandwidth, downlink data from the second terminal to the first terminal while using a second subset of the plurality of subframes, the downlink data modulated using a second modulation scheme, the second modulation scheme being different than the first modulation scheme.

According to another aspect of the present invention, another method for wireless communication between a first terminal and a second terminal is provided using a plurality of cyclically repeating TDM frames, each comprising a plurality of subframes. The method comprises transferring uplink data from the first terminal to the second terminal while using a first subset of the plurality of subframes; measuring channel quality associated with one or more channels, while using a second subset of the plurality of subframes, to select a working frequency; and transferring, using the working frequency, downlink data from the second terminal to the first terminal while using a third subset of the plurality of subframes.

According to another aspect of the present invention, another method for wireless communication between a first terminal and a second terminal is provided using a plurality of cyclically repeating time division multiplexing (TDM) frames, each comprising a plurality of subframes. The method comprises transferring uplink data from the first terminal to the second terminal while using a first subset of the plurality of subframes, the uplink data comprising synchronization information useful for synchronizing operations of the first terminal and the second terminal and the uplink data modulated using a first modulation scheme; and transferring downlink data from the second terminal to the first terminal while using a second subset of the plurality of subframes, the downlink data modulated using a second modulation scheme being different than the first modulation scheme.

According to another aspect of the present invention, another method for wireless communication between a remote terminal and a communication module of a vehicle is provided, said vehicle comprising a sensor, and said wireless communication using a plurality of cyclically repeating TDM frames, each TDM frame comprising a plurality of subframes. The method comprises transferring uplink data from the remote terminal to the communication module of the vehicle while using a first subset of the plurality of subframes; and transferring downlink data that includes data from the sensor, from the communication module of the vehicle to the remote terminal while using a second subset of the plurality of subframes, wherein a number of subframes in the second subset is greater than a number of subframes in the first subset. According to another aspect of the present invention, a data communication system is provided. The data communication system comprises a first terminal comprising a uplink transmitter and a downlink receiver; and a second terminal comprising an uplink receiver and a downlink transmitter, wherein the uplink transmitter is configured to transmit uplink data to the second terminal in a first time slot; the downlink receiver is configured to measure, in a second time slot, channel quality associated with one or more channels to select to a working frequency and to receive, using the working frequency, downlink data provided by the second terminal in a third time slot; the uplink receiver is configured to receive the uplink data in the first time slot; and the downlink transmitter is configured to transmit, using the working frequency, the downlink data in the third time slot.

FIG. 1 illustrates an exemplary communication system 100 for implementing aspects of the present invention, according to an embodiment. As illustrated, the system 100 includes a first terminal 102 and a second terminal 104 that can communicate with each other. In various embodiments, the first terminal or the second terminal can include or be included in any device that is capable of transmitting and receiving (digital or analog) data, such base stations, relay stations, remote control devices, mobile platforms or movable objects such as (manned or unmanned) vehicles in land, water or air, computer server, personal computer, mobile phone, smart phone, smart TV, setup box, or other mobile or stationary devices or objects. In an embodiment, the first terminal is a base station and the second terminal is an unmanned aerial vehicle (UAV).

In various embodiments, the data communication between the first terminal and the second terminal can occur over a communication channel established between the first terminal and the second terminal. Examples of communication channels may include copper wires, optical fibers, and wireless communication channels. The data transmitted over the communication channels may be represented as electromagnetic signals such as electrical voltage, radiowave, microwave, infrared signals, or the like.

As illustrated, the data communication between the first terminal 102 and the second terminal 104 can include an uplink 106 and a downlink 108. The uplink 106 is a communication link used to transmit data from the first terminal 102 to the second terminal 104. Conversely, the downlink 108 is used to transmit data from the second terminal 104 to the first terminal 102. In an embodiment, the uplink 106 and the downlink 108 share the same communication channel but at different times. In other embodiments, the uplink 106 and the downlink 108 can use different communication channels. For uplink communication, the first terminal 102 can include an uplink transmitter 110 for transmitting data (hereinafter uplink data) over the uplink 106 to the second terminal 104. And the second terminal 104 can include an uplink receiver 114 for receiving the transmitted uplink data. Similarly, for downlink communication, the second terminal 104 can include a downlink transmitter 116 for transmitting data (hereinafter downlink data) over the downlink 108 to the first terminal 102. And the first terminal 102 can include a downlink receiver 112 for receiving the transmitted downlink data. In some embodiments, the transmitter and receiver of a terminal can be combined into a transceiver. The transceiver may combine the functionalities of the transceiver and the receiver which may share common circuitry and/or a single housing. For example, the transmitter and the receiver can be implemented by the same physical equipment or separate devices with shared components. In other embodiments, the transmitter and receiver may not share common circuitry and/or housing.

As used herein, uplink data and downlink data refer to data and signals that are transmitted using an uplink and a downlink, respectively. The uplink data and the downlink data can include different kinds of data. In some embodiments, uplink data can include data or signals for controlling operations of the second terminal. In some embodiments, the uplink data can control the movements or operations of a vehicle or other movable object. For example, uplink data can include information for controlling the speed, position, orientation or other operational or navigational parameters associated with a UAV or components thereof (e.g., payload device, sensing module, propulsion system, etc.). The uplink data can also include synchronization information usable for synchronizing the operations of the first terminal and the second terminal. For example, the uplink data can include timing information with respect to the scheduling and/or order of the uplink data transmission and downlink transmission. The uplink data can also include error message or other feedback information, such as whether data transmitted by one terminal has been successfully received by the other terminal, whether data received is of satisfactory quality, and the like.

In some embodiments, downlink data can include image data or other data acquired, collected or generated by the second terminal. In some embodiments, the downlink data can include raw data or processed data. Raw data may include sensor data collected by a sensing module (including one or more sensors) associated with the second terminal, such as image data, location data, acceleration or orientation data, and the like. Raw data may be processed, for example, by a processing unit, to derive or generate processed data such as state information associated with the second terminal (e.g., position, movement, orientation) and/or about the surrounding environment. Examples of the sensors used to acquire such sensor data can include visual or light sensors (e.g., cameras, video cameras, infrared sensors), audio sensors, proximity sensors, location sensor (e.g., GPS receiver, altimeter), magnetic sensors (e.g., magnetometer, compass), temperature sensors, touch sensors, inertial sensors (e.g., gyroscopes, accelerometers), and the like. The sensor data and/or processed data thereof may be transmitted as downlink data to the first terminal. In other embodiments, the downlink data can also include other information such as error information, feedback information, synchronization information, and the like.

To optimize the transmission of uplink data comprising primarily of control data and transmission of downlink data comprising large amount of image data or other sensor data, the uplink need to be robust while the downlink needs to have a wide data bandwidth (or a wideband downlink). As discussed herein, the uplink data and the downlink data can include different types of data. Accordingly, different requirements may exist for the transmission of uplink data and downlink data. For example, the uplink data often includes critical control information. Such control information may be used to control various operations of a UAV. For example, the control information may be used to control a navigation system or propulsion system of the UAV. In such cases, the loss or corruption of such control information can cause the loss of control of and/or damage to the UAV. On the other hand, downlink data typically include sensor data (e.g., image data) from a movable object (e.g., UAV) to a receiving device (e.g., base station). The loss or corruption of the downlink data typically requires only retransmission of the downlink data and does not affect the operations of the movable object. Therefore, the uplink data often need to be transmitted in a more robust fashion than the downlink data. As used herein, robustness refers to the ability of a communication link to operate properly even with errors, noise, interference, disturbance or other adverse factors. In contrast, the robustness requirement may not be as high for the downlink data as for the uplink data since the downlink data is not typically considered critical for the operations of a remotely controlled object. However, the downlink data often includes a larger amount of data (e.g., image data) than the uplink data (e.g., control data). Hence, the data bandwidth requirement is typically higher for the downlink data than for the uplink data. As used herein, data bandwidth refers to the rate of data transfer over a unit of time. The wider the data bandwidth the higher rate the data transfer is transferred at. Typically, data bandwidth is measured in bit rate such as bit/s, kbit/s, Mbit/s, Gbit/s, Tbit/s, or the like. In various embodiments, the data bandwidth can be measured by a rate of total transferred data (e.g., gross bit rate), an average rate of successfully delivered data (e.g., throughput), a rate of transferred useful information (e.g., net bitrate), or the like. To summarize, in order to optimize the transmission of uplink data comprising primarily of control data and transmission of downlink data comprising large amount of image data or other sensor data, the uplink need to be robust while the downlink needs to have a wide data bandwidth (or a wideband downlink).

As described herein, various methods are provided for achieving a robust uplink and a wideband downlink in a data communication system. Some of which are described below.

According to an aspect of the present invention, different coding schemes are used to encode uplink data and downlink data to achieve robust uplink and wideband downlink. In particular, a more efficient coding scheme can be used to encode downlink data to reduce the bandwidth allocated for the codes. In general, forward error correction (FEC) or channel coding can be used to control errors and to increase reliability in data transmission over communication channels using the principle of redundancy. Channel coding schemes can include block codes and convolutional codes such as Reed-Solomon (RS) coding, Turbo coding, low-density parity-check (LDPC), and the like. In some embodiments, one single coding scheme is used to encode a given set of data. In other embodiments, two or more different types of coding schemes can be used in combination on a given set of data such as using concatenation, interweaving or other techniques. Using one or more channel coding schemes, k-bit block or stream of input data can be encoded to produce an n-bit block or stream of output data, where n>k. Note the extra n-k parity bits that are generated as a result of the encoding. The encoded data can be decoded by a receiver of the encoded data to detect and/or correct errors in the original input data.

For a communication channel with a fixed data bandwidth, channel coding generally reduces the data bandwidth used for useful information because extra bandwidth needs to be allocated for the parity bits as a result of the channel encoding. Thus, the efficiency of a given channel coding scheme or a combination of a plurality of channel coding schemes can be measured by a ratio of useful bits over the total bits (including both useful and parity bits) as a result of the encoding. For example, under a coding scheme with a 3/4 efficiency ratio, 3/4 of the total encoded bits is useful bits. The rest 1/4 of the total bits are parity bits. Different channel coding schemes can have different levels of efficiency.

In general, low-efficiency coding schemes tend to provide more redundancy, increasing the ability to recover from errors (using the redundancy), thereby increasing the reliability and robustness of data transmission. Additionally, the decoding process for low-efficiency coding schemes generally requires less computational resources (e.g., power, memory, processing power, etc.) on the receiver's side than for the decoding process for the high-efficiency coding schemes. Therefore, the low-efficiency coding schemes are well-suited for encoding uplink data (e.g., control data) because uplink data typically need to be transmitted with a high level of reliability while the receivers of the uplink data such as mobile platforms or movable objects (e.g., UAVs, mobile devices) typically have a limited amount computation resources for the decoding process. In some embodiments, low-efficiency coding schemes may have an efficiency ratio of 1/10 or less. In other embodiments, low-efficiency coding schemes may have an efficiency ratio that is greater than 1/10.

Conversely, high-efficiency coding schemes generally trade reduced redundancy for better data bandwidth (by decreasing the amount of parity bits relative to the useful information). Furthermore, the decoding process for high-efficiency coding schemes is generally more computationally complex and time consuming than the decoding process for the low-efficiency coding schemes. Thus, such high-efficiency coding schemes are well-suited for encoding downlink data (e.g., image data) which is typically large in quantity. Additionally, the receivers of the downlink data such as base stations typically have access to more computation resources for the decoding process. In some embodiments, high-efficiency coding schemes may have an efficiency ratio of 1/2 or more. In other embodiments, low-efficiency coding schemes may have an efficiency ratio that is less than 1/2.

In an embodiment, the downlink data can be encoded using the highly efficient LDPC and the downlink data can be encoded using Direct Sequence Spread Spectrum (DSSS) which can be considered a coding scheme (in addition to a modulation scheme) that is relatively simply and less efficient. DSSS also provides other benefits such as resistance to intended or unintended jamming, sharing of a single channel among multiple users, reduced signal/background-noise level hamper, determination of relative timing between transmitter and receiver, and the like.

According to another aspect of the present invention, different modulation schemes can be used to modulate the uplink data and the downlink data to achieve robust uplink and wideband downlink. Such modulation schemes may be used in addition to or instead of using different channel coding schemes discussed above. In some embodiments, one single modulation scheme is used to modulate a given set of data. In other embodiments, two or more different types of modulation schemes can be used in combination on a given set of data.

In an embodiment, the downlink data is modulated using more carrier signals than those used to modulate the uplink data. For example, the downlink data can be modulated using a multi-carrier modulation scheme whereas the uplink data can be modulated using a single-carrier modulation scheme. In general, the demodulation process is computationally simpler for a single-carrier modulation scheme than for a multi-carrier modulation scheme partly because a multi-carrier modulation scheme needs to solve the problem of interference between the subcarriers and of the imposition of subcarrier signals. Therefore, single-modulation schemes are more suited for modulating uplink data than multi-carrier modulation schemes because data can be more quickly and easily demodulated, requiring less computational resources for the demodulation process. On the other hand, multi-carrier modulation schemes are more suited for downlink data single-modulation schemes because multiple carrier signals, and hence more data, can be transmitted at once.

In another embodiment, the downlink data is modulated using a higher-order modulation scheme than that used to modulate the uplink data. In general, modulation order of a digital modulation scheme is determined by the number of the different symbols that can be transmitted using the modulation scheme. For example, a second order modulation scheme, such as binary shift keying (BSK), Gauss frequency-shift keying (GFSK), can transmit only two symbols (e.g., "0" and "1"). Whereas a higher-order modulation scheme, such as quadrature phase shift keying (QPSK) or quadrature amplitude modulation (QAM), can transmit more symbols. In some embodiments, a given modulation scheme can have multiple variations with different efficiency ratios (e.g., 1/2, 2/3, 3/4, 5/6) and/or other parameters. For example, a 16QAM variation can have an efficiency ratio of 1/2 while another 16QAM variation can have an efficiency ratio of 3/4. By using a higher-order modulation scheme for the downlink data, more data can be transmitted at once through the downlink. At the same time, more computational power is typically required to demodulate the downlink data on the receiver side (e.g., base station).

In various embodiments, different combinations of coding and/or modulation schemes can be used, respectively, for uplink data and downlink data. For example, in an embodiment, the uplink can use a combination of low-order and/or single-carrier modulation schemes and low-efficiency coding schemes such as DSSS, FHSS and GFSK to ensure the robustness and reliability of uplink data. In contrast, the downlink can use a combination of high-order and/or multi-carrier modulation schemes and high-efficiency coding schemes such as QAM and LDPC to ensure wide data bandwidth for downlink data.

According to another aspect of the present invention, the uplink and the downlink can be transmitted with different data bandwidths. In particular, the downlink data can be transmitted using a wider data bandwidth than the uplink data to enable a large amount of image data or other sensor data to be transmitted in a reasonable amount of time. Various methods can be used to allocate asymmetric data bandwidths between the uplink and the downlink, some of which are discussed above. For example, asymmetric data bandwidths can be achieved by using different modulation and/or channel coding schemes as discussed above.

In addition, in some embodiments, uplink data and downlink data can be transmitted over frequency channels with different channel bandwidths (such as measured in Hz or bits per second). For example, a frequency channel with a wider channel bandwidth can be used to transmit downlink data so as to provide a wider data bandwidth whereas a frequency channel with a narrower channel bandwidth can be used to transmit uplink data. For example, the frequency channel bandwidth for uplink data transmission may be between 100 KHz and 2 MHz; and the frequency channel bandwidth for downlink data transmission may be between 2 MH and 10 MH. In various embodiments, the uplink frequency channel band may or may not overlap with the downlink frequency channel band. In a time-division multiplexing (TDM) communication mode (discussed below in more detail), the uplink frequency channel band and the downlink frequency channel band can overlap without interfering with each other because the uplink transmission and downlink transmission do not overlap in time.

In some embodiments, to achieve different data bandwidths, uplink data and downlink data can be transmitted for different lengths of time. For example, where the uplink and the downlink shares the same communication channel, such as in a TDM fashion, a larger fraction of the total time can be allocated for downlink transmission than for uplink data transmission, as discussed below in more detail.

According to an aspect of the present invention, interference between uplink data transmission and downlink data transmission can be avoided by using a TDM communication mode. In particular, uplink data transmission and downlink data transmission take place over a shared communication channel but do not overlap in time. Besides interference avoidance, the need for two separate communication systems and hence two sets of communication equipments (one of uplink and one for downlink), as required by traditional systems, can be eliminated. Instead, only one set of communication equipment is need for both uplink and downlink transmissions, reducing the space required to accommodate the communication equipment as well as the cost for maintaining and operating the communication equipment.

Under the TDM communication mode, the time domain is divided into a plurality of cyclically repeating TDM frames. Each frame includes a plurality of fixed-length subframes. In some embodiments, all subframes within the frame have the same length. In some other embodiments, the subframes within the frame can have different lengths. In some cases, the TDM frames each have the same number of subframes and/or the same frame length. In other cases, the TDM frames can have variable number of subframes and/or variable frame lengths. Uplink data transmission can occur in some of the plurality of subframes (the uplink subframes) or a first time slot, and downlink data transmission can occur in some of the other subframes (the downlink subframes), or a second time slot. The uplink subframes (the first time slot) do not overlap in time with the downlink subframes (the second time slot). As used herein, a time slot refers to a set of one or more subframes. A time slot does not include a guard interval. A frame can comprise one or more non-overlapping time slots. In some embodiments, a TDM frame can also include subframes dedicated to functions other than uplink data transmission or downlink data transmission. For example, in some embodiments, the frame can include channel measurement subframes during which channel conditions associated with a number of channels are monitored or measured. In some other embodiments, the TDM frame can also include error correction subframes, synchronization subframes, and the like. Between two of consecutive subframes or at the end of a given subframe, there can be an inter-subframe guard interval to ensure that distinct transmissions do not interfere with each other. Similarly, between two consecutive frames or at the end of a given frame, there can be an inter-frame guard interval to avoid interference between transmissions.

Figure 2:
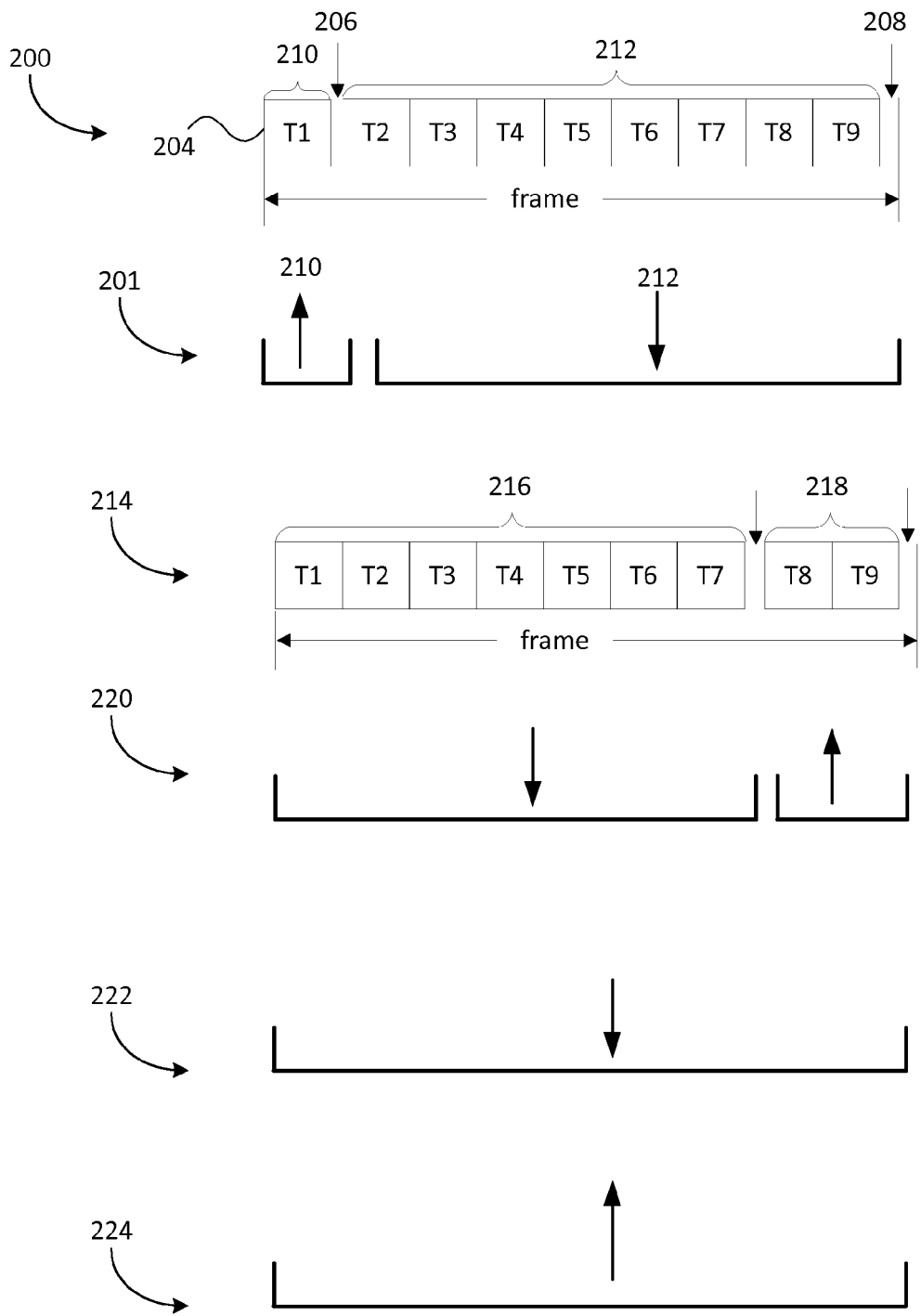
FIG. 2 illustrates some exemplary time-division multiplexing (TDM) frames, in accordance with some embodiments.

FIG. 2 illustrates some exemplary TDM frames, in accordance with some embodiments. As illustrated, a TDM frame 200 comprises a plurality of fixed-length subframes 204 and optionally one or more guard intervals 206 and 208 between consecutive subframes/frames. Some of the subframes 210 (or time slot 210) of a given TDM frame (e.g., subframe T1) can be allocated for uplink data transmission (such as indicated by the up-arrow 210 in the corresponding simplified representation 201 of the frame). Some of the other subframes 212 (or time slot 212) of the same TDM frame (e.g., subframes T2-T9) can be allocated for downlink data transmission (such as indicated by the up-arrow in 212 in the corresponding simplified representation 201 of the frame). In some embodiments, more than one subframes in a TDM frame can be allocated for uplink transmission, such as illustrated by the uplink subframes 218 (T8-T9) of the frame 214. In some cases, all of the subframes in a TDM frame may be allocated to a single function, such as uplink data transmission or downlink data transmission. For example, all subframes in the frame 222 are allocated for downlink data transmission and all subframes in frame 224 are allocated for uplink data transmission. Thus, in various embodiments, a TDM frame can have zero, one, two, or more uplink time slots, downlink time slots, and/or time slots allocated for other functions.

The order of the uplink subframes and the downlink subframes can occur in any suitable order. For example, the uplink data transmissions may occur earlier in a TDM frame than downlink data transmissions. In such a case, the uplink subframes can occur earlier in a TDM frame than for the downlink subframes, such as illustrated by the frames 200 (and its simplified representation 201). Alternatively, the uplink data transmissions may occur later in a TDM frame than downlink data transmissions. In such a case, the uplink subframes occur earlier in a TDM frame than for the downlink subframes, such as illustrated by the frame 214 (and its simplified representation 220). In some embodiments, uplink transmissions and downlink transmissions may occur in an alternate fashion in a TDM frame such that the uplink subframes and the downlink subframes may be interweaved with each other.

In an embodiment, the number of down subframes allocated for downlink data transmission is more than the number of uplink subframes allocated for uplink data transmission. Since the amount of uplink data, which includes control data, is typically less than that of downlink data which can include images, videos or other sensor data, such an asymmetric allocation of the subframes between uplink data transmission and downlink data transmission advantageously allows more downlink data than uplink data to be transmitted over the same period of time over the same communication channel.

In various embodiments, the allocation of the subframes dedicated to uplink data transmission and to downlink data transmission can be determined based on a variety of factors. For example, the allocation of the subframes may be determined based at least in part on one or more conditions or characteristics associated with the communication channel with which the uplink data transmission and the downlink transmission occur, data transmission requirement (e.g., with respect to robustness, reliability, bandwidth, bit rate, throughput, rate of control and/or status update, and the like), hardware and/or software parameters or conditions of the communication terminals, environmental factors, and the like. In some instances, the allocation of the subframes (e.g., how to divide between uplink transmission and downlink transmission) can be determined in real or near real time. Based on such determination, the allocation of the subframes can remain the same or adjusted over time. In some cases, the allocation can be adjusted dynamically in real or near real time.

According to another aspect of the present invention, synchronization information usable for synchronizing the operations of the first terminal and the second terminal is transmitted using the uplink connection to ensure robust and reliable operations of the system even under poor channel conditions. Typically, such synchronization information may include the TDM subframe allocation or scheduling information, error messages, feedback information, and the like. Such synchronization information typically needs to be transmitted between the terminals as well as between the transmitter and the receiver with the same terminal to ensure the synchronized communications between a pair of terminals. By relying in the more robust uplink (as opposed to the less robust downlink) for the inter-terminal communication, the synchronization information is more likely to be delivered reliably even with unfavorable channel conditions such as noise, interference, errors, and the like.

According to another aspect of the present invention, one or more subframes of the TDM frame (hereinafter the channel measurement subframes) can be allocated for the channel scan or measurement, in addition to uplink and downlink data transmission. During the channel measurement subframes, characteristics or conditions associated the current communication channel or electromagnetic environment can be measured to select an optimal working frequency used for downlink data transmission. Specifically, characteristics or conditions associated with N (where N>=1) available frequency channels can be measured to select an optimal working frequency. In various embodiments, such characteristics or conditions can include noise, interference, signal-to-noise ratio (SNR), bit error rate, fading rate, and the like. For example, an optimal working frequency may have the lowest noise or energy among the measured frequency channels. In an embodiment, the channel measurement and working frequency selection process is performed by the receiver of the downlink data (e.g., a base station). In other embodiments, aspects of the channel measurement and working frequency selection process may be performed, alternatively or additionally, by the transmitter of the downlink data (e.g., a UAV), or a third device.

In some embodiment, conditions associated with the N frequency channels can be scanned and measured over a period of M frames (where M<=N), where one or more of the N frequency channels are measured during the channel measurement subframe(s) of the each of the M frames. Once all the N frequency channels have been measured, an optimal working frequency can be selected based on the results of the measurement. For example, in an embodiment, the frequency channel with the lowest noise or interference is selected as the working frequency. As another example, the frequency selection may be based on another factor or a combination of some or all of the factors. In an embodiment, the selected working frequency can be used in subsequent frames to transfer downlink data (e.g., by the downlink transmitter and by the receiver of the downlink data), until a new working frequency is selected after another round of channel measurements.

Figure 3:
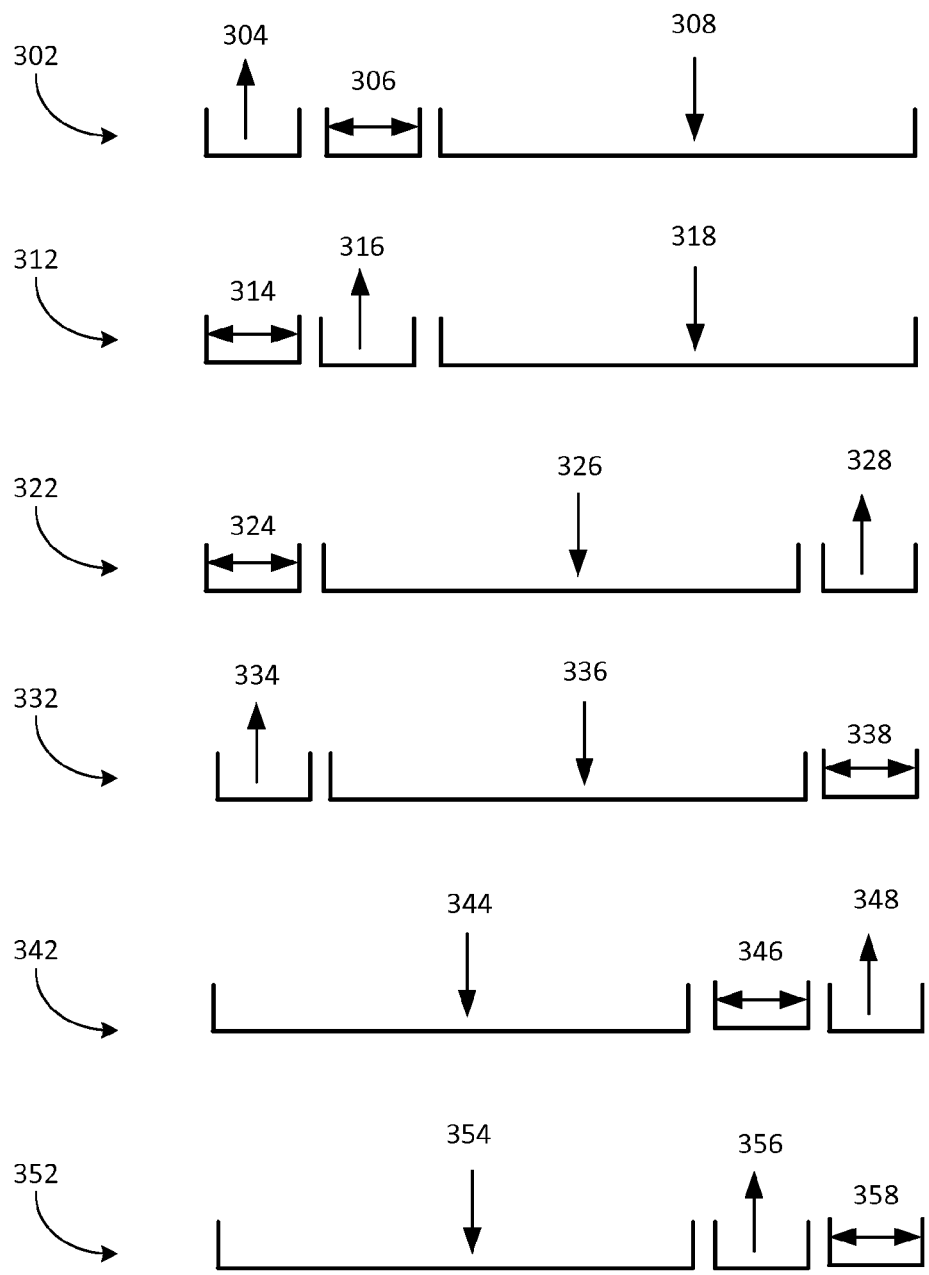
FIG. 3 illustrates some exemplary TDM frames, in accordance with some embodiments.

In various embodiments, the uplink subframes, downlink subframes and the channel measurement subframes can be arranged in any suitable order. For example, FIG. 3 illustrates some exemplary TDM frames, in accordance with some embodiments. As illustrated, in frame 302, the uplink subframes 304 occur before the channel measurement subframes 306, which occur before the downlink subframes 308. In other words, the first time slot 304 is used for uplink data transmission, the second time slot 306 is used for channel measurement, and the third time slot 308 is used for downlink data transmission. In frame 312, the channel measurement subframes 314 occur before the uplink subframes 316, which occur before the downlink subframes 318. In other words, the first time slot 314 is used for channel measurement, the second time slot 316 is used for uplink data transmission, and the third time slot 318 is used for downlink data transmission. In frame 322, the channel measurement subframes 324 occur before the downlink subframes 326, which occur before the uplink subframes 328. In other words, the first time slot 324 is used for channel measurement, the second time slot 326 is used for downlink data transmission, and the third time slot 328 is used for uplink data transmission. In frame 332, the uplink subframes 334 occur before the downlink subframes 336, which occur before the channel measurement subframes 338. In other words, the first time slot 334 is used for uplink data transmission, the second time slot 336 is used for downlink data transmission, and the third time slot 338 is used for channel measurement. In frame 342, the downlink subframes 344 occur before the channel measurement subframes 346, which occur before the uplink subframes 348. In other words, the first time slot 344 is used for downlink data transmission, the second time slot 346 is used for channel measurement, and the third time slot 348 is used for uplink data transmission. In frame 352, the downlink subframes 354 occur before the uplink subframes 356, which occur before the channel measurement subframes 358. In other words, the first time slot 354 is used for downlink data transmission, the second time slot 356 is used for uplink data transmission, and the third time slot 358 is used for channel measurement. In some embodiments, the frame can be divided into more or less than three distinct intervals. For example, the frame may include only two intervals, one for channel measurement and one for uplink or downlink data transmission. As another example, the frame may include only one interval for uplink or downlink data transmission or for channel measurement. In yet some other embodiments, the frame can be divided into more than three distinct intervals each allocated to uplink data transmission, downlink data transmission, channel measurement, and some other function.

Figure 4:
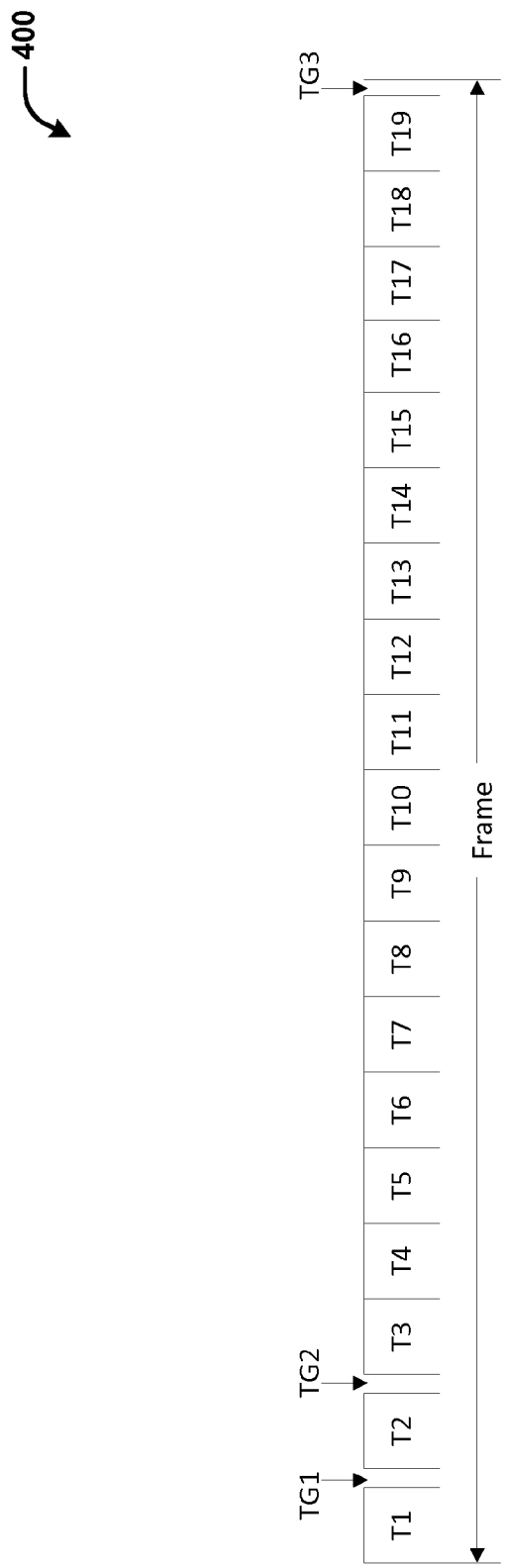
FIG. 4 illustrates an exemplary TDM frame, in accordance with an embodiment.

FIG. 4 illustrates an exemplary TDM frame 400, in accordance with an embodiment. As illustrated, the TDM frame 400 includes a total of 19 subframes (T1-T19) that is divided into three time slots. The first time slot includes subframe T1, the second time slot includes subframe T2, and the third time slot includes subframes T3-T19. In addition, the TDM frame 400 includes a first guard interval TG1 between the first and the second time slots, a second guard interval TG2 between the second and the third time slots and a third guard interval TG3 after the third time slot. In various implementations, each of the three time slots can include any suitable number of subframes and the order of the three time slots can be different than the illustrated order.

FIG. 5 illustrates an exemplary configuration 500 of the TDM frame shown in FIG. 4, in accordance with an embodiment. As illustrated, the frame is 5 ms comprising 19 subframes (T1-T19) of 0.25 ms each, two guard intervals TG1 and TG2 of 150 µl each, and a third guard interval TG3 of 200 µs. At the beginning of the frame, uplink data transmission occurs in uplink subframe, T1, for 250 ms. Note that while FIGS. 4-5 illustrate only one subframe as allocated to uplink data transmission, in other embodiments, more than one subframes may be allocated for uplink data transmission. During this time, the transmitter of the uplink data (e.g., a base station) transmits uplink data to a receiver of the uplink data (e.g., a mobile platform such as a UAV). The uplink data can include control information including remote control commands or signals for controlling operations of the receiver of the control information, such as for controlling the speed, orientation, position, and other characteristics associated with a UAV. Further, the uplink data can include synchronization information such as timing information related to the allocation and/or scheduling of the subframes, and the like. The synchronization information may indicate, for example, when the receiver of the uplink data should start transmitting downlink data and/or for how long. For example, in the illustrated example, the synchronization information may enable the receiver of the uplink data to transmit downlink data from subframe T3 to subframe T13. In some cases, the uplink data can include working frequency that is selected for downlink transmission as a result of the channel measurement described herein. The selected working frequency can be selected from a plurality of available frequency channel based on one or more channel condition(s) such as noise, SNR, interference, and the like. In some cases, the uplink data can include status information, error message, and the like with respect to events in the current frame or in one or more previously occurred frames. For example, such status information can indicate whether downlink data during downlink transmission in the current frame or in a previous frame has been received successfully.

As illustrated by FIG. 5, the uplink data is modulated using a low-order modulation scheme, frequency-shift keying (FSK). Other methods for coding and/or modulating the uplink data can be provided to ensure robustness of uplink data. For example, a relatively low-efficiency channel coding scheme with a 3/4 efficiency ratio can be used.

In some embodiments, the frequency channel used for the uplink connection can be predetermined and known for the transmitter and/or receiver of the uplink. Where the frequency channel is only known to one but not the other, the other party may establish the connection via a channel scan. In some embodiments, the uplink connection can utilize a frequency-hopping method of transmission where the frequency channel keeps changing according to a pseudorandom sequence known to both the transmitter and the receiver of the connection. Such a frequency-hopping mechanism can provide the uplink resistance against interference.

Following the guard interval TG1 of 150 µs, channel quality can be measured in the channel measurement frame, T2. While FIGS. 4-5 illustrate only one subframe as allocated to channel measurement, in other embodiments, more than one subframes may be allocated for channel measurement. During T2, the quality of the communication channel can be monitored and/or measured by measuring one or more characteristics or conditions currently associated with one or more scanned channels. In some embodiments, only one channel is measured per frame. In other embodiments, more than one channels may be measured per frame. In various embodiments, such characteristics or conditions can include noise, interference, signal-to-noise ratio (SNR), bit error rate, fading rate, and the like. In an embodiment, the channel measurement is performed by the receiver of the downlink data (e.g., a base station). In other embodiments, the channel measurement may be performed, alternatively or additionally, by the transmitter of the downlink data terminal (e.g., a UAV), or a third device.

Still referring to FIG. 5, following the guard interval TG2 of 150 μs, the transmitter of downlink data can start transmitting during the downlink subframes from T3 until T19. In an embodiment, the transmitter of downlink data transmits status information during T3 to indicate whether the uplink data has been successfully received. If so, then the transmitter of uplink data can start transmitting other downlink data such as image data or other sensor data starting T4 until T19 (16 subframes). Thus, the amount of time dedicated to image data transmission is 0.25*16=4 ms. If the uplink data has not been successfully received, the uplink transmitter can determine whether or not to attempt to retransmit the uplink data (e.g., for a predetermined number of times, such as 20). In some embodiments, working frequency used for downlink transmission can be selected as a result of previously-performed channel measurement as described herein. The transmitter and the receiver of the downlink can be informed of the working frequency via synchronization messages.

As discussed herein, the downlink data can be encoded and/or modulated to ensure wide data bandwidth. For example, the downlink data can be encoded using a high-efficiency coding scheme such as LDPC. Alternatively and/or additionally, the downlink data can be modulated using a multi-carrier and/or high-order modulation scheme. Examples of downlink modulation schemes can include QPSK, QAM, and the like. In the illustrated example, the downlink data is encoded and/or modulated using any one or more of QPSK, 16QAM, 64QAM, and 256QAM.

Still referring to FIG. 5, following the inter-frame guard interval TG3 of 200 μs, a new frame can start over again. In some embodiments, the allocation of subframes between uplink transmission, downlink transmission and/or channel measurement can be dynamically changed based at least in part on a variety of factors such as the transmission status (e.g., whether downlink and/or uplink data has been received successfully), conditions of the communication channel, data transmission requirement (e.g., with respect to robustness, reliability, bandwidth, bit rate, throughput, rate of control and/or status update, and the like), and the like. For example, when the current channel condition is very poor, the entire frame may be dedicated to uplink transmission without any downlink transmission to prioritize the establishment of the uplink connection. As another example, more subframes may be allocated for downlink transmission if a large amount of downlink data needs to be transmitted quickly. Alternatively or additionally, the frequency bandwidths associated with the uplink and/or the downlink may also be adjusted dynamically based on similar factors. For example, a wider frequency bandwidth may be allocated for downlink transmission if a lot of downlink data needs to be transferred. Furthermore, the coding and/or modulation schemes used for the uplink and/or downlink data can also be dynamically changed based on similar factors.

FIG. 6 illustrates another exemplary configuration 600 of the TDM frame shown in FIG. 4, in accordance with an embodiment. The illustrated configuration is similar to that shown in FIG. 5, except that the order of the channel measurement subframe (T1) and the uplink subframe (T2) is reversed. In FIG. 6, channel measurement occurs in T1, before the uplink data transmission which occurs in T2.

In various embodiments, the allocation of frames can be used to satisfy different data transmission requirements or constraints with respect to the transmission of control data versus image data. Such requirements may be related to the amount of data, rate of data transfer, rate of refreshing or update of image frames, error rate, latency, delay, and the like. For example, the allocations of frames shown in FIGS. 5-6 can be used to satisfy the following control data transmission requirements (assuming the communication is between a base station and a UAV): 1) the transmission rate from a base station to a UAV is no less than 26.3 kbps; 2) the transmission rate from the UAV to the base station is no less than 8 kbps; and 3) the interval between control and status update is no more than 7 ms, assuming the required amount of data for such update is 0.1841 kb.

As shown in FIGS. 5-6, the transmission of control data from the base station to the UAV takes 0.25 ms (T2), which is 0.25/5=5% of the total frame (5 ms). Given a 4 MHz channel bandwidth, when a 3/4 channel coding scheme is used, the transmission rate of control data from a base station to a UAV is 4*3/4*0.05=0.15 Mbps>26.3 kbps, thereby satisfying the requirement 1) above. Similarly, the transmission of status data from the UAV to the base station also takes 0.25 ms (T3), therefore the transmission rate of control data from the UAV to the base station is greater than 8 kpbs, thereby satisfying the requirement 2) above. Finally, based on the transmission rate, the amount of data transmitted in each frame can be calculated as 0.15 Mbps*0.002 s=0.3 kb. Therefore, in three consecutive frames (6 ms), the amount of transmitted data is 0.3*3=0.9 kb>0.1841 kb. Therefore, the control and status update requirement 3) is also satisfied. The image data transmission rate can be similarly calculated based on the frame allocation illustrated in FIGS. 5-6. As illustrated discussed above, 16 subframes (T4-T19) or 0.25*16=4 ms is allocated for image data transmission (where T3 is allocated for transmission of status data). Given the total frame of 5 ms, the image data transmission takes up 4/5=80% of the total time in the frame. The image data transmission rate (e.g., throughput) can be calculated as the product of frequency bandwidth, slot ratio, encoding ratio, bits per symbol, and frequency efficiency. For example, for QPSK 3/4, the encoding ratio is 3/4 and bits per symbol is 2. Assuming that the spectrum efficiency is 1 bit/s/Hz and frequency bandwidth is 4 MHz, we get the throughput of 4*0.8*0.75*2=4.8 Mbps.

| Modulation Method | Image data transmission rate (Mbps) |
| --- | --- |
| QPSK 3/4 | 4.8 |
| 16QAM 1/2 | 6.4 |
| 16QAM 3/4 | 9.6 |
| 64QAM 1/2 | 9.6 |
| 64QAM 2/3 | 12.8 |
| 64QAM 3/4 | 14.4 |
| 64QAM 5/6 | 16 |

Figure 7A:
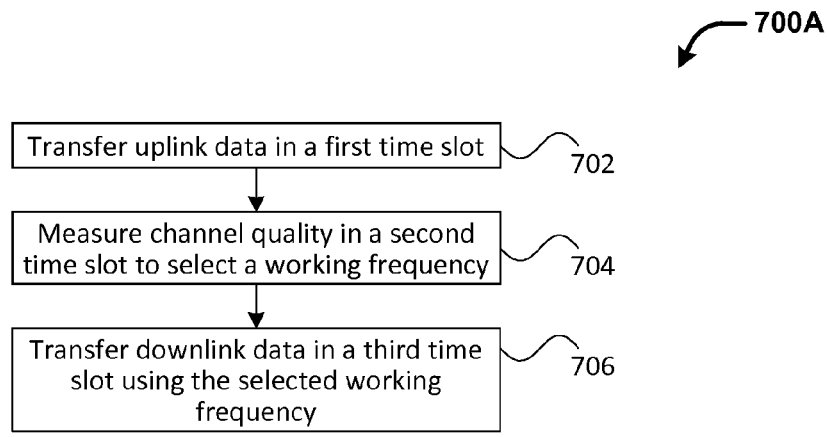
FIG. 7a illustrates an exemplary process for implementing a method of data communication, in accordance with an embodiment.

FIG. 7a illustrates an exemplary process 700a for implementing a method of data communication, in accordance with an embodiment. Aspects of the process 700A may be performed by one or more terminals such as discussed herein. Some or all aspects of the process 700A (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

In an embodiment, the process 700A includes transferring 702 uplink data in a first time slot. In some embodiments, the first time slot can include a TDM time slot encompassing one or more uplink subframe(s) such as illustrated by 304, 316, 328, 334, 348, and 356 of FIG. 3. The transfer can occur between a first terminal (e.g., a base station) and a second terminal (e.g., a UAV). Specifically, transferring 702 the uplink data can include the first terminal transmitting the uplink data to the second terminal and the second terminal receiving the uplink data from the first terminal. In some embodiments, uplink data can include control information for controlling the operations (e.g., navigation, remote-sensing) and/or state of the second terminal (e.g., position, orientation). Additionally or alternatively, uplink data can include synchronization information that includes timing information indicating the scheduling and/or allocation of a TDM frame. For example, the timing information can indicate that a TDM frame can comprise a first time slot, a second time slot, and a third time slot. The TDM frame can also include one or more guard intervals between consecutive time slots and/or between frames. Each of the time slots can comprise one or more fixed-length subframes such as discussed in FIGS. 2-4.

In an embodiment, the first terminal includes an uplink transmitter configured to transmit uplink data and the second terminal includes an uplink receiver configured to receive the uplink data. Furthermore, the second terminal includes a downlink transmitter configured to transmit downlink data and the first terminal includes a downlink receiver configured to receive the downlink data. In some embodiments, the uplink transmitter and the downlink receiver of the first terminal can communicate with each other, for example, via signals or messages. Likewise, the uplink receiver and the downlink transmitter of the second terminal can also communicate with each other. In some embodiments, the uplink transmitter and the downlink receiver can be co-located in the same device to reduce the overall size and cost. Likewise, the uplink receiver and the downlink transmitter can also be co-located.

The uplink data can be encoded and/or modulated using one or more predetermined coding schemes and/or modulation schemes such as described herein to provide robustness and reliability to the uplink data. For example, in an embodiment, the uplink data can be encoded/modulated using a combination of DSS, FHSS and GFSK techniques. Upon receiving the uplink data, the uplink receiver can use the corresponding decoding/demodulation schemes acquire decoded/demodulated uplink data.

After transmitting the uplink data, the uplink transmitter of the first terminal can generate synchronization information and provide it to the downlink receiver of the first terminal. The synchronization information may include timing information indicating the scheduling and/or allocation of a TDM frame, such that the downlink receiver knows when and/or how to receive downlink data (e.g., image data).

After receiving the uplink data, the uplink receiver of the second terminal can acquire the synchronization information and provide it to the downlink transmitter of the second terminal. The synchronization information may include timing information indicating the scheduling and/or allocation of a TDM frame, such that the downlink transmitter knows when and/or how to transmit downlink data (e.g., image data).

In an embodiment, the process 700A includes measuring 704 channel quality in a second time slot to select a working frequency. In some embodiments, the second time slot can include a TDM time slot encompassing one or more channel measurement subframes such as illustrated by 306, 316, 324, 338, 346, and 358 of FIG. 3. The second time slot does not overlap in time with the first time slot. During the channel measurement subframes, characteristics or conditions associated the current electromagnetic environment can be measured to select an optimal working frequency used for downlink data transmission. Specifically, characteristics or conditions associated with N (where N>=1) available frequency channels can be measured to select an optimal working frequency. In various embodiments, such characteristics or conditions can include noise, interference, signal-to-noise ratio (SNR), bit error rate (BER), fading rate, and the like. For example, an optimal working frequency may have the lowest noise among the measured frequency channels.

In an embodiment, the channel measurement and working frequency selection process is performed by the receiver of the downlink data (e.g., a base station). For example, the channel measurement and working frequency selection can be performed by a downlink receiver of a first terminal. Subsequently, the downlink receiver of the first terminal can provide the working frequency information to the uplink transmitter of the first terminal, which can transmit such working frequency information to an uplink receiver of the second terminal. Upon receiving the working frequency information, the uplink receiver can provide such information to the downlink transmitter which can be configured to transmit downlink data using the working frequency. In other embodiments, aspects of the channel measurement and working frequency selection process may be performed, alternatively or additionally, by the transmitter of the uplink data, or other device or process.

In an embodiment, the process 700A includes transferring 706 downlink data in a third time slot using the selected working frequency. In some embodiments, the third time slot can include a TDM time slot encompassing one or more downlink subframe(s) such as illustrated by 308, 318, 326, 336, 344, and 354 of FIG. 3. The third time slot does not overlap in time with the first time slot or the second time slot. In some embodiments, transferring 706 the downlink data can include the second terminal transmitting the downlink data to the first terminal and the first terminal receiving the downlink data from the second terminal. In some embodiments, downlink data can include image data or other sensor data acquired by the second terminal or devices in communication with the second terminal. For example, the data can be acquired by one or more sensors onboard and/or in communication with the second terminal. In an embodiment, the second terminal transmits the downlink data via the downlink transmitter and the first terminal receives the downlink data via the downlink receiver at the working frequency selected at step 704 of the process 700A.

The downlink data can be encoded and/or modulated using one or more predetermined coding schemes and/or modulation schemes such as described herein to provide a wide data bandwidth for the uplink data. For example, in an embodiment, the downlink data can be encoded and/or modulated using a combination of LDPC and QAM. Upon receiving the downlink data, the downlink receiver can use the corresponding decoding and/or demodulation schemes to acquire the decoded and/or demodulated downlink data.

The downlink receiver of the first terminal can measure the quality of the downlink data received and provide the result of the quality measurement to the uplink transmitter of the first terminal, which can then transmit the result to the uplink receive of the second terminal. The uplink receiver of the second terminal, upon receiving the quality measurement result, can provide the result to the downlink transmitter of the second terminal. Based on the result, the downlink transmitter can determined whether to change the coding and/or modulation schemes used for the downlink data. In some embodiments, the coding and/or modulation schemes may change dynamically based on the quality measurement result and/or channel conditions such as noise, interference, SNR, BER, and the like. If it is determined that different coding/modulation schemes need to be applied, then the new coding and/or modulation schemes can be applied to the downlink data, which is then transmitted to the first terminal. For example, when the channel conditions are determined to be good, the coding and/or modulation schemes configured to provide wider data bandwidth may be used; whereas when the channel conditions are poor, the coding and/or modulation schemes configured to provide more reliability and robustness to the downlink data may be used. The first terminal can then use the decoding and/or demodulation schemes corresponding to the new coding and/or modulations schemes to acquire the transmitted downlink data. Otherwise, if it is determined that the existing coding and/or modulation schemes need not be changed (e.g., because they are optimal given the current channel conditions), then the existing coding/modulation schemes and the corresponding decoding/demodulation schemes are used, respectively, to transmit and receive downlink data.

Figure 7B:
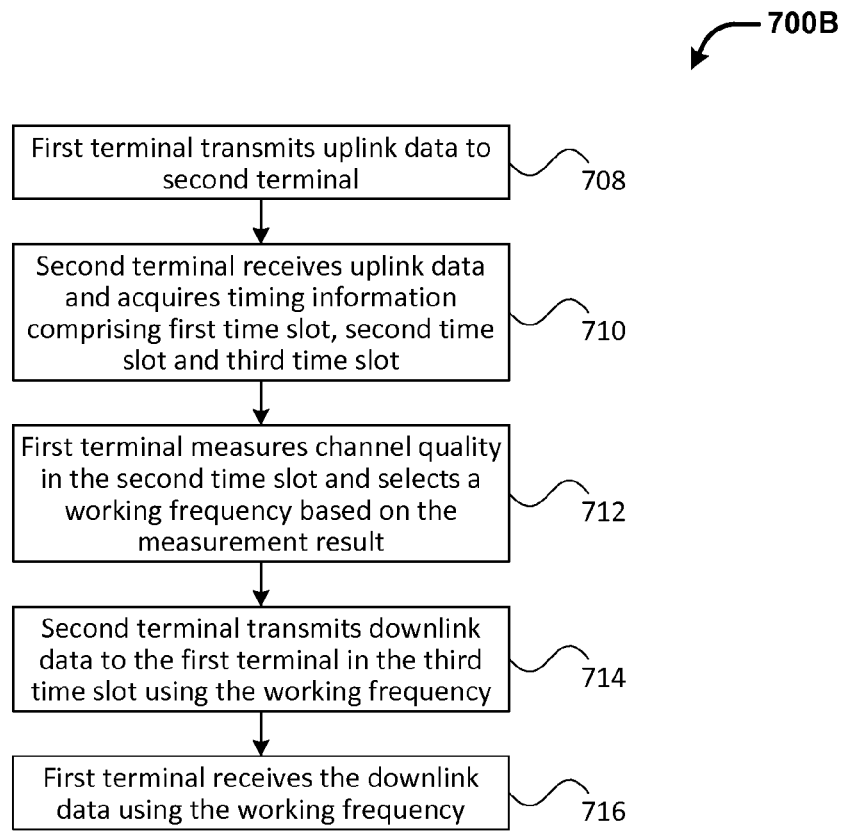
FIG. 7b illustrates another exemplary process for implementing a method of data communication, in accordance with an embodiment.

FIG. 7B illustrates another exemplary process 700B for implementing a method of data communication, in accordance with an embodiment. In particular, the process 700B can be implemented by a first terminal and a second terminal such as described in FIG. 7A. As illustrated, at step 708, a first terminal transmits 708 uplink data to a second terminal. At step 710, a second terminal receives the uplink data and acquires timing information from the received uplink data. The timing information can comprise a first time slot, a second time slot, and a third time slot. In an embodiment, the timing information can also include a first guard interval, a second guard interval and a third guard interval before or after any of the above time slots. At step 712, the first terminal measures channel quality in the second time slot and selects a working frequency based on the measurement result. At step 714, the second terminal transmits downlink data to the first terminal in the third time slot using the working frequency. And at step 716, the first terminal receives the downlink data transmitted by the second terminal using the working frequency.

In an embodiment, the first terminal includes an uplink transmitter and a downlink receiver. The uplink transmitter is configured to transmit uplink data to the second terminal. The downlink receiver is configured to perform channel measurement in the second time slot to select a working frequency based on the measurement result. The downlink receiver is also configured to receive downlink data at the working frequency.

The uplink transmitter, after transmitting the uplink data to the second terminal, can generate synchronization information and provide the synchronization information to the downlink receiver of the first terminal, to notify the downlink receiver to operate (e.g., preparing to receive downlink data).

In an embodiment, the second terminal includes an uplink receiver and a downlink transmitter. The uplink receiver is configured to receive the uplink data transmitted by the uplink transmitter and to acquire timing information from the uplink data. In some embodiments, some amount of computation or calculation may be required to acquire such timing information. The downlink transmitter is configured to transmit downlink data to the first terminal in the third time slot.

The uplink receiver of the second terminal can calculate the timing information from the uplink data to acquire the timing information and provide the timing information to the downlink transmitter, to notify the downlink transmitter to operate (e.g., preparing to transmit downlink data). The timing information can be substantially similar to the synchronization information discussed above.

The downlink receiver can provide information about the working frequency (the working frequency information) to the uplink transmitter and the uplink transmitter can transmit the working frequency information. The uplink receiver can receive the working frequency information and provide the working frequency information to the downlink transmitter, and the downlink transmitter can receive the working frequency information.

In some embodiments, the downlink transmitter encodes and/or modulates the downlink data according to predetermined coding and/or modulations schemes prior to transmitting the downlink data. The downlink receiver, after receiving the downlink data, demodulates and/or decodes the received data according to suitable demodulation and/or decoding schemes corresponding to the modulation and/or coding schemes used.

In some embodiments, the downlink receiver measures the quality of the received downlink data and provides the results to the uplink transmitter, which transmits the results. The uplink receiver receives the results and provides the results to the downlink transmitter. The downlink transmitter determines, based on the results and the current coding and/or modulation methods, whether to change the current coding and/or modulation methods. If it is determined that such change is required, then the downlink transmitter uses the updated coding and/or modulation methods to encode and/or modulate the downlink data and transmits the data. The downlink receiver receives the downlink data encoded and/or modulated using the updated methods and demodulates and/or decodes the data using the corresponding methods. If it is determined that such a change is not required (that is the current coding and/or modulation methods are optimal), then the downlink transmitter continues to transmit downlink data using existing methods.

Figure 8:
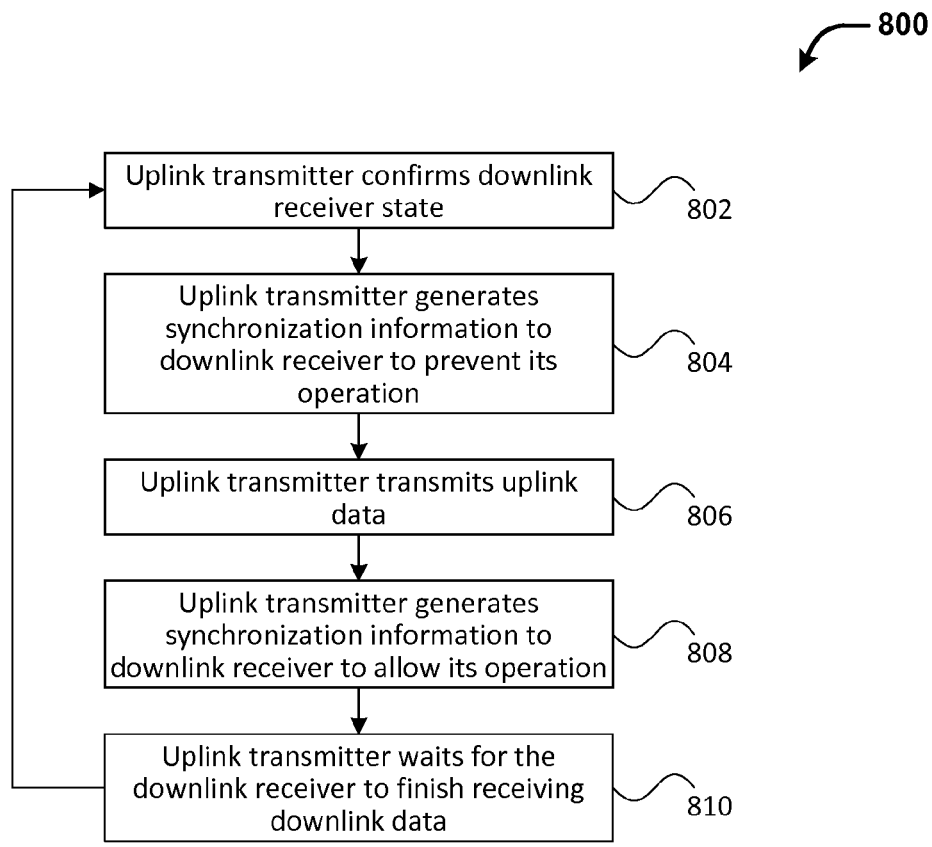
FIG. 8 illustrates an exemplary process for implementing a method of data communication, in accordance with an embodiment.

FIG. 8 illustrates an exemplary process 800 for implementing a method of data communication, in accordance with an embodiment. The process 800 can be implemented by a first terminal such as a base station, or a similar control device that is configured to transmit uplink data to a second terminal (e.g., a UAV) and to receive downlink data from the second terminal. In some embodiments, process 800 can be implemented, on a recurring basis, for each TDM frame. The first terminal includes an uplink transmitter and a downlink receiver and the second terminal can include an uplink receiver and a downlink transmitter, such as described herein.

In an embodiment, the process 800 includes confirming 802, by the uplink transmitter, the state of the downlink receiver. In some embodiments, the uplink transmitter collects or the downlink receiver may provide information regarding the state of the downlink receiver. Such state information may indicate, for example, whether the downlink receiver is in the process of receiving downlink data or has finished receiving downlink data.

Once the downlink transmitter has finished receiving downlink data, such as determined from the state information, the uplink transmitter can generate 804 synchronization information and provide it to the downlink receiver to temporarily prevent the downlink receiver from working. If the downlink transmitter has not finished receiving downlink data, the uplink transmitter can wait for the downlink transmission to finish.

Once it is determined that the downlink transmitter has finished receiving downlink data, the uplink transmitter can start transmitting 806 uplink data, for example, to the remotely-controlled second terminal (e.g., a UAV). The uplink data can include control information as well as synchronization information usable for synchronizing the operations of the first terminal and the second terminal. For example, the uplink data can include timing information regarding the allocation and/or scheduling of TDM subframes or time slots. For example, the synchronization information may indicate when and/or how to transmit downlink data. In various embodiments, the uplink data can be encoded and/or modulated according to coding and/or modulation schemes suitable for uplink data, as described herein, to ensure robustness of the uplink transmission.

Once the uplink data has been transmitted, the uplink transmitter can generate 808 synchronization information and provide it to the downlink receiver to allow the downlink transmitter to operate. The synchronization may include timing information substantially similar to the synchronization provided to the uplink receiver. For example, the synchronization information may indicate when and/or how to receive downlink data.

Finally, the uplink transmitter waits 810 for the down receiver to finish receiving downlink data for the current TDM frame before the process 800 is repeated, starting with step 802. In various embodiments, various characteristics or parameters associated with the data transmission such as coding and/or modulation schemes, subframe allocation or scheduling (e.g., between uplink transmission and downlink transmission), channel bandwidth allocation (e.g., between uplink transmission and downlink transmission), and the like, can be dynamically determined and/or adjusted based on a variety of factors such as channel conditions, data characteristics (e.g., amount, quality, importance, BER requirement), and the like. For example, the number of subframes for the downlink can be increased to increase the downlink throughput, when a higher-definition video is needed to be transmitted from the second terminal to the first terminal. Such adjustment may be performed at any suitable time. For example, the adjustment may occur on a per frame basis or every few frames. As another example, the adjustment may occur when certain predefined threshold values (e.g., SNR, BER) has been reached or exceeded.

Figure 9A:
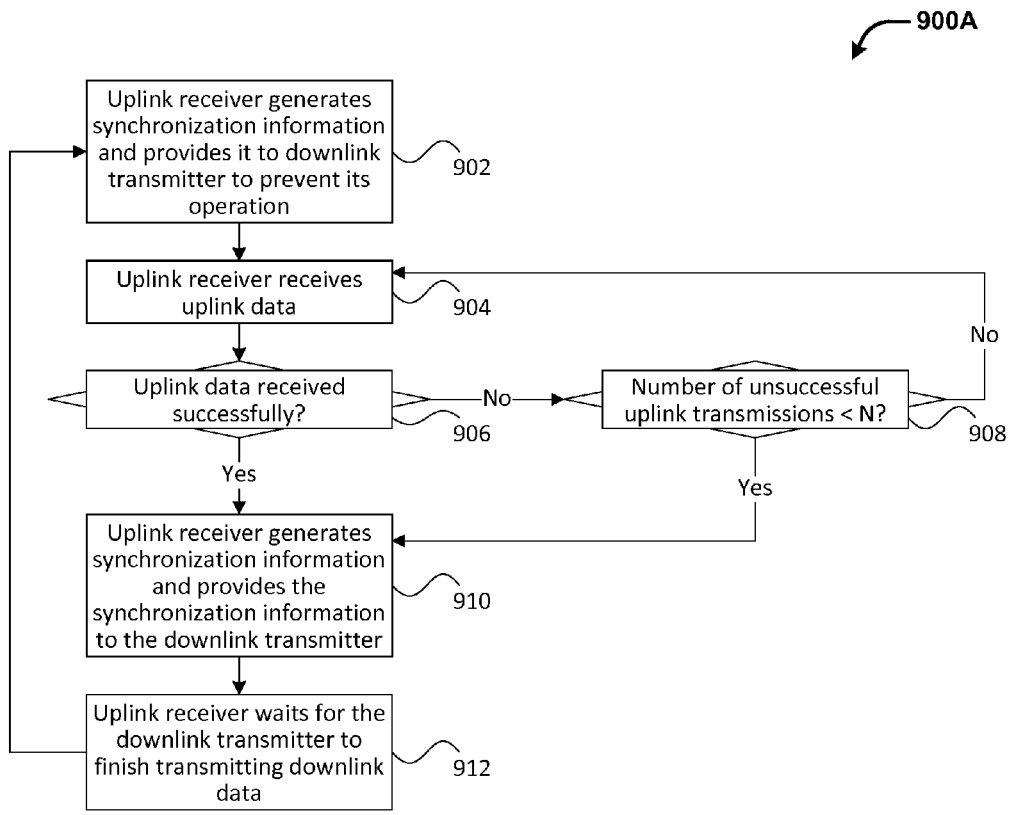
FIG. 9a illustrates an exemplary process for implementing a method of data communication, in accordance with an embodiment.

FIG. 9a illustrates an exemplary process 900A for implementing a method of data communication, in accordance with an embodiment. The process 800 can be implemented by a second terminal such as a mobile platform (e.g., UAV) that is configured to receive uplink data from a first terminal (e.g., base station, handheld remote control device) and to transmit downlink data to the first terminal. In some embodiments, process 900A can be implemented, on a recurring basis, for each TDM frame discussed herein. The second terminal can include an uplink receiver and a downlink transmitter, respectively, to receive uplink data from a first terminal and to transmit downlink data to the first terminal.

In an embodiment, the process 900A includes the uplink receiver generating and providing 902 synchronization information to the downlink transmitter to prevent its operation. Subsequently, the uplink receiver can start receiving 904 uplink data. At step 906, it is determined whether the uplink data is received successfully. If it is determined that the uplink data has been received successfully, the uplink generates 908 synchronization information and provides it to the downlink transmitter to allow it to operate accordingly. The synchronization information can include timing information indicating the allocation/scheduling of TDM subframes. The timing information can be provided to the downlink transmitter to allow it to transmit downlink data at the suitable time and/or in a suitable manner.

In some embodiments, the downlink transmitter can transmit data at a predetermine working frequency or a working frequency selected according to the channel measurement methods described herein. The working frequency information can be provided by the first terminal. The downlink data can include image data or other sensor data that is acquired by the second terminal or sensors or devices associated with the second terminal. Prior to transmission, the downlink data can be encoded and/or modulated using any coding and/or modulation schemes suitable for downlink data such as those described herein. In some embodiments, the coding and/or modulation schemes used are configured to provide a wide data bandwidth for the downlink transmission.

In some cases, the synchronization information provided to the downlink transmitter can be derived from the uplink data. In other cases, such as when uplink data cannot be successfully received, the synchronization information can be calculated based on a timer such as a crystal oscillator, an atomic oscillator, or the like, independent from the uplink data. Where a crystal oscillator is used, environmental factors (e.g., temperature, humidity, pressure, vibration) and aging can cause the generation of inaccurate synchronization information after a threshold period of time. In some embodiments, the threshold period of time is defined by the time it takes to get N unsuccessful uplink data transmissions, where N>=2. Within the threshold period of time (e.g., when the number of unsuccessful uplink data transmission is less than N), downlink transmission is repeated according to the generated synchronization information. Beyond the threshold period of time (e.g., when the number of unsuccessful uplink data transmission N), the generated synchronization information may be considered inaccurate and the second terminal may enter into a uplink-only mode where the uplink transmission monopolizes the whole communication channel (i.e., only uplink transmission is allowed and downlink transmission is not allowed) until uplink data can be successfully received again. Only after the establishment of the uplink, is the downlink transmitter allowed to start transmitting downlink data again. Advantageously, the successful establish of the uplink transmission is prioritized (e.g., over downlink transmission) under poor channel conditions to ensure robust transmission of critical control data. In addition, the downlink data can be retransmitted (e.g., for up to N−1 times), increasing the reliability of downlink data transmission.

As illustrated by FIG. 9A, if it is determined 906 that the uplink data has not been received successfully, then at step

908, it is determined whether the number of unsuccessful uplink data transmissions has is less than N (where N>=2). If it is determined that the number of unsuccessful uplink data transmissions is less than N, then the uplink transmitter can generate the synchronization information using a local timer (e.g., a crystal oscillator) and provides it to the downlink transmitter. In such cases, the generated synchronization information is still considered relatively accurate and thus still provided to the downlink transmitter (step 910). If it is determined that the number of unsuccessful uplink data transmissions is greater or equal to N, then no synchronization information is generated and the uplink transmitter can continue receiving uplink data (step 904) until the uplink data is successfully received.

In an embodiment, when synchronization information is provided to the downlink transmitter, the uplink receiver waits 908 for the downlink transmitter to finish transmitting the downlink data for the current TDM frame before the process 900A is repeated again, starting at step 902.

Figure 9B:
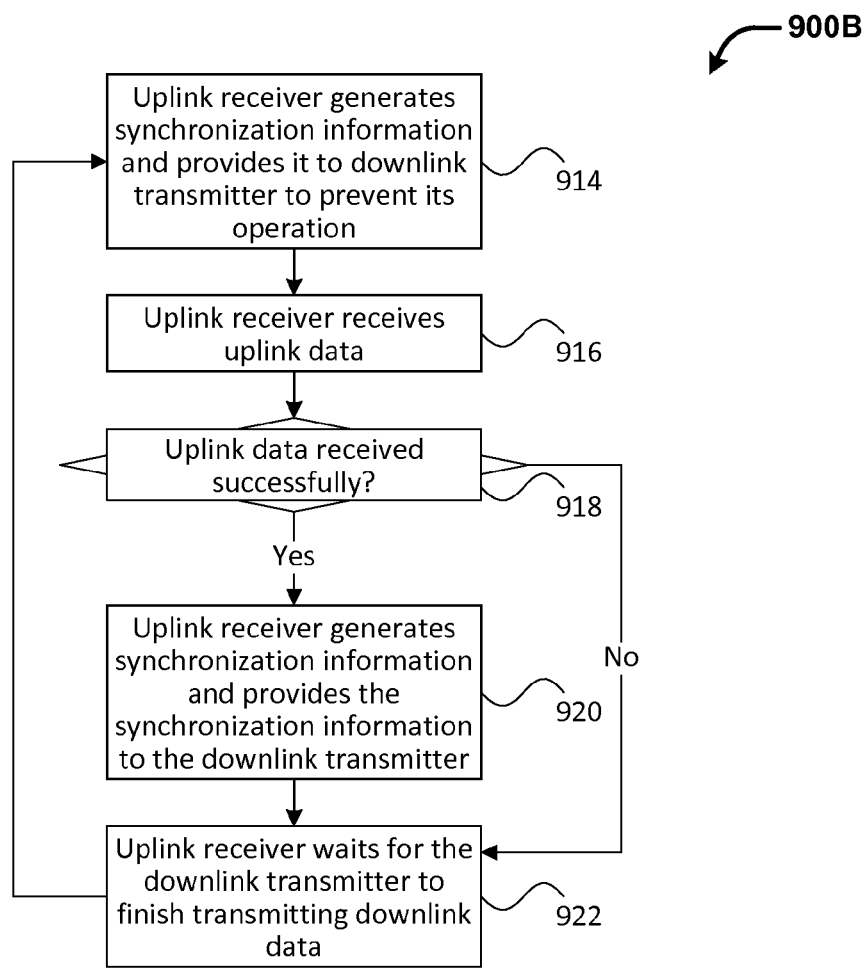
FIG. 9b illustrates another exemplary process for implementing a second terminal, in accordance with an embodiment.

FIG. 9*b* illustrates another exemplary process 900B for implementing a second terminal, in accordance with an embodiment. The process 900B is similar to the process 900A discussed in FIG. 9A. For example, steps 914, 916, 920 and 922 can correspond to steps 902, 904, 910 and 912 of FIG. 9A. However, at step 918, if it is determined that the uplink data has not be received successfully, the process 900B proceeds to step 922 where the uplink receiver waits for the downlink transmitter to finish transmitting downlink data, rather than determining whether the number of unsuccessful uplink transmissions is less than N, as depicted by step 908 of FIG. 9A.

Figure 10:
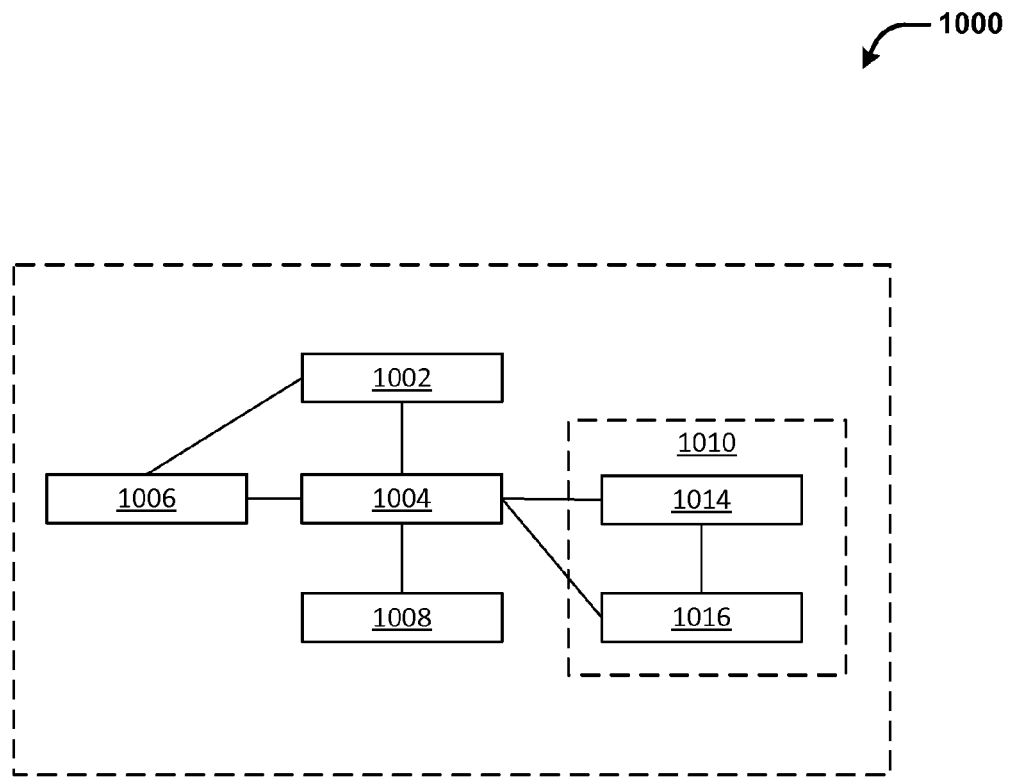
FIG. 10 illustrates exemplary system for implementing methods of the present invention, in accordance with some embodiments.

FIG. 10 illustrates exemplary system 1000 for implementing methods of the present invention, in accordance with some embodiments. The system 1000 can be used to control a mobile platform or movable object such as a UAV. The system 1000 can be used in combination with any suitable embodiment of the systems, devices, and methods disclosed herein. The system 1000 can include a sensing module 1002, processing unit 1004, memory 1006, control module 1008, and communication module 1010.

The sensing module 1002 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1002 can be operatively coupled to a processing unit 1004 having a plurality of processors.

The processing unit 1004 can have one or more processors, such as a programmable processor (e.g., a central processing unit (CPU)). The processing unit 1004 can be operatively coupled to a memory 1006. The memory 1006 can include transitory and/or non-transitory storage media configured to store data, and/or logic, code, and/or program instructions executable by the processing unit 1004 for performing one or more routines or functions. The memory can include one or more memory units (e.g., removable media or external storage such as an SD card or random access memory (RAM)). In some embodiments, data from the sensing module 1002 can be directly conveyed to and stored within the memory units of the memory 1006. The memory units of the memory 1006 can store logic, code and/or program instructions executable by the processing unit 1004 to perform any suitable embodiment of the methods described herein. For example, the processing unit 1004 can be configured to execute instructions causing one or more processors of the processing unit 1004 to prepare data (e.g., sensor data acquired by the sensing module) for transmission (e.g., by encoding and/or modulating the data), process data received by the communication module 1010 (e.g., by decoding and/or demodulating the data), cause communication module 1010 to transmit and/or receive data, cause transfer of synchronization information between the components of the communication module 1010, and the like. The memory units can store sensor data from the sensing module to be processed by the processing unit 1004. In some embodiments, the memory units of the memory 1006 can be used to store the processing results produced by the processing unit 1004. Although FIG. 10 depicts a single processing unit 1004 and a single memory 1006, one of skill in the art would appreciate that this is not intended to be limiting, and that the system 1000 can include a plurality of processing units and/or memory units of the memory.

In some embodiments, the processing unit 1004 can be operatively coupled to a control module 1008 configured to control a state of the movable object. For example, the control module 1008 can be configured to control the propulsion mechanisms of the movable object to adjust the spatial disposition, velocity, and/or acceleration of the movable object with respect to six degrees of freedom. Alternatively or in combination, the control module 1008 can control the state of one or more components of the movable object (e.g., the sensing module) or objects carried by the movable object (e.g., a payload device such as a camera). In some embodiments, the control module can be controlled by remotely-transmitted control data such as included in the uplink data discussed herein. The control data may be used to control the propulsion mechanism, the sensing module, or other components of the movable object. In some cases, the control data is critical for controlling operations of the movable object and needs to be transmitted and received in a robust fashion.

The processing unit 1004 can be operatively coupled to a communication module 1010 configured to transmit and/or receive data from one or more remote devices (e.g., base station, handheld remote control device, and the like). For example, the communication module 1010 can transmit and/or receive one or more of sensor data from the sensing module 1002, processing results produced by the processing unit 1004, control data, synchronization information, and the like. The communication module 1010 can include a transmitter 1014 and a receiver 1016 respectively configured to transmit and receive data to and from a remote device. In some embodiments, the communication module can include a transceiver that combines the functionalities of the transmitter and the receiver. In some embodiments, the transmitter and the receiver can communicate with each other as well as with the processing unit 1004. For example, the transmitter and receiver can exchange synchronization information to synchronize the operations thereof. Any suitable means of communication can be used, such as wired communication or wireless communication described herein.

Figure 11:
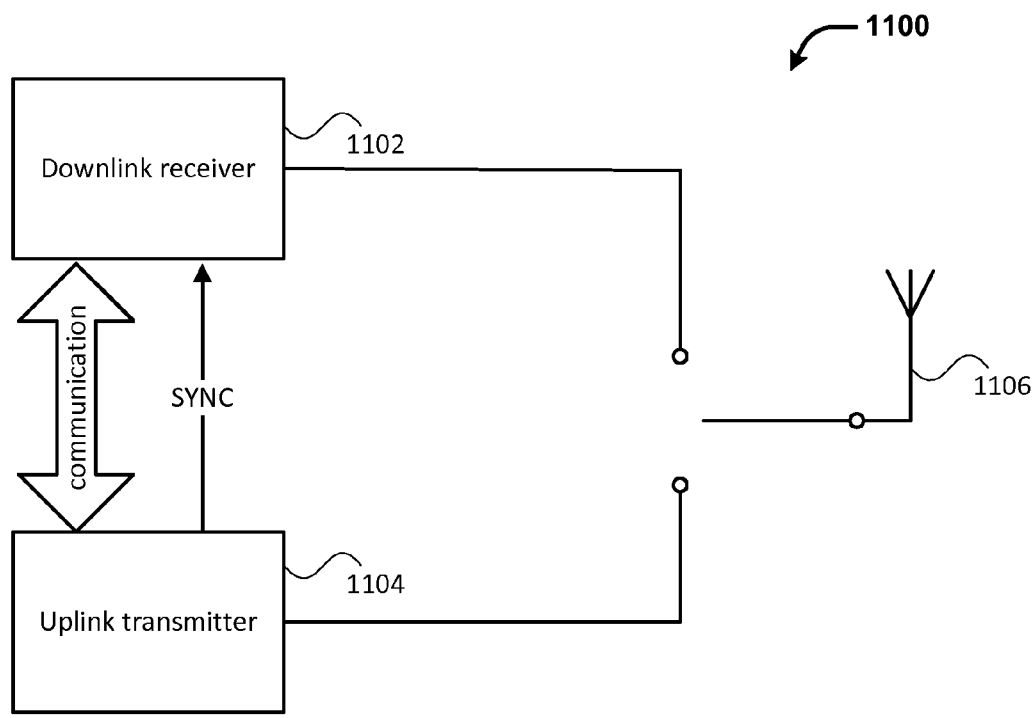
FIG. 11 illustrates an exemplary communication terminal, in accordance with an embodiment.

FIG. 11 illustrates an exemplary communication terminal 1100, in accordance with an embodiment. In some embodiments, the communication terminal 1100 can be implemented by a base station, handheld remote control device or similar devices capable of transmitting uplink data and receiving downlink data such as described herein. For example, the communication terminal 1100 can include mobile or non-mobile devices such as workstation, personal computer, laptop, mobile phone, smart phone, smart TV, setup box, handheld control device, and the like. The communication terminal 1100 includes a downlink receiver 1102, an uplink transmitter 1104, and an antenna 1106. The antenna 1106 is configured to receive and transmit electromagnetic signals such as radio frequency signals. The antenna 1106 can be internal or external. In some embodiments, more than one antenna may be provided.

The uplink transmitter 1104 may be configured to encode and/or modulate, and transmit uplink data using suitable uplink coding and/or modulation schemes discussed herein. The downlink receiver 1104 may be configured to receive, demodulate and/or decode downlink data using suitable downlink demodulation and/or decoding schemes corresponding to the downlink modulation and/or decoding schemes discussed herein. The uplink coding and/or modulation schemes may be different than the downlink coding and/or modulation schemes in that the uplink schemes may be configured to provide more robustness to the uplink transmission whereas the downlink schemes may be configured to provide better data bandwidth for the downlink transmission. In an embodiment, the uplink transmitter 1104 and the downlink receiver 1102 are configured to share the same antenna 1106 to reduce space and cost required to accommodate multiple antennas, even though different coding and/or modulation schemes may be used for uplink and downlink transmissions. Such an arrangement can be made possible by the fact that, in some embodiments, uplink and downlink data transmissions do not overlap in time. In other embodiments, the uplink transmitter 1104 and the downlink receiver 1102 can be configured to use different antennas.

The downlink receiver 1102 and uplink transmitter 1104 can be configured to communicate with each other. The communicated information can include synchronization information such as timing information related to TDM subframe scheduling or allocation as well as actual data such as received downlink data, uplink data to be transmitted, and the like.

The downlink receiver 1102 and uplink transmitter 1104 can be connected to a processing unit (not shown) that is similar to the processing unit 1004 discussed in FIG. 10. The processing unit may be configured to perform signal coding, data processing, input/output processing, and other functions necessary for the implementing the communication terminal 1100. The processing unit may be connected to a memory (not shown) that is similar to the memory 1006 discussed in FIG. 10. The memory may include transitory and/or non-transitory storage media configured to store data, and/or logic, code, and/or program instructions executable by the processing unit for performing any suitable embodiment of the methods described herein.

Figure 12:
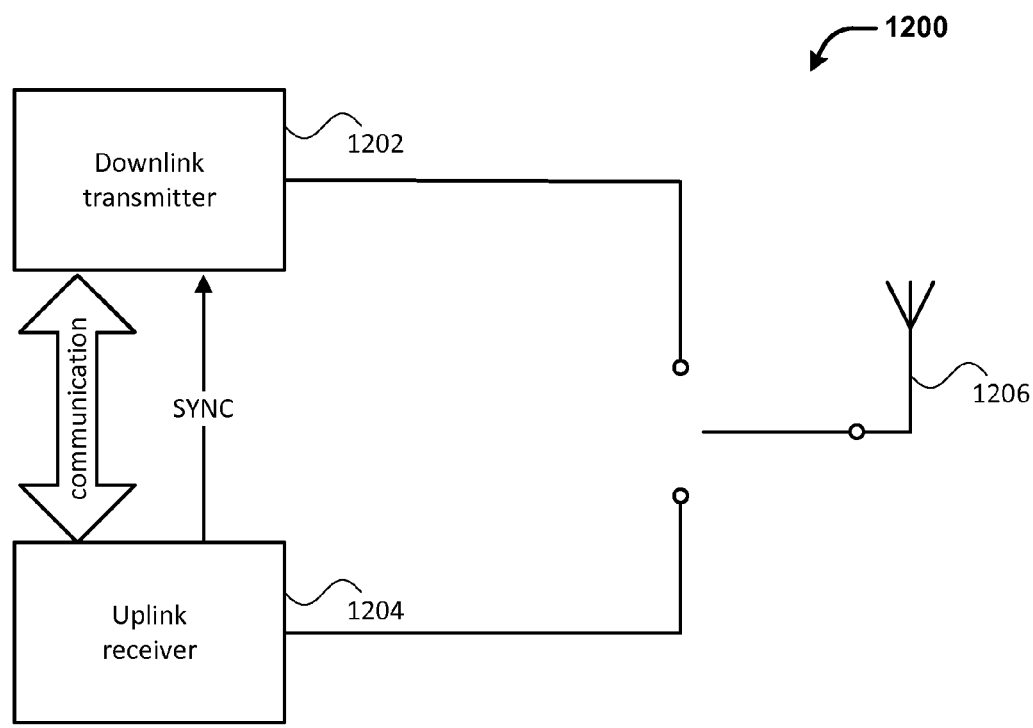
FIG. 12 illustrates an exemplary communication terminal, in accordance with an embodiment.

FIG. 12 illustrates an exemplary communication terminal 1200, in accordance with an embodiment. The communication terminal 1200 can be implemented by a mobile platform (e.g., UAV) or other remotely-controlled movable object capable of transmitting downlink data and receiving uplink data such as to and from a communication terminal 1100 discussed in FIG. 1. The communication terminal 1200 includes an uplink receiver 1204, a downlink transmitter 1202, and an antenna 1206. The antenna 1206 may be similar to the antenna 1106 discussed in FIG. 11.

The downlink transmitter 1202 may be configured to encode and/or modulate and transmit downlink data using suitable downlink coding and/or modulation schemes discussed herein. The uplink receiver 1204 may be configured to receive, demodulate and/or decode uplink data using suitable uplink demodulation and/or decoding schemes corresponding to the uplink modulation and/or coding schemes discussed herein. The uplink coding and/or modulation schemes may be different than the downlink coding and/or modulation schemes in that the uplink schemes may be configured to provide more robustness to the uplink transmission whereas the downlink schemes may be configured to provide better data bandwidth for the downlink transmission. In an embodiment, the downlink transmitter 1202 and the uplink receiver 1204 are configured to share the same antenna 1206 to reduce space and cost required to accommodate multiple antennas, even though different coding and/or modulation schemes may be used for uplink and downlink transmissions. Such an arrangement can be made possible by the fact that, in some embodiments, uplink and downlink data transmissions do not overlap in time. In other embodiments, the downlink transmitter 1202 and the uplink receiver 1204 can be configured to use different antennas.

The uplink receiver 1204 and downlink transmitter 1202 can be configured to communicate with each other. The communicated information can include synchronization information such as timing information related to TDM subframe scheduling or allocation as well as actual data such as received uplink data, downlink data to be transmitted, and the like.

The uplink receiver 1204 and downlink transmitter 1202 can be connected to a processing unit (not shown) that is similar to the processing unit 1004 discussed in FIG. 10. The processing unit may be configured to perform signal coding, data processing, input/output processing, and other functions necessary for the implementing the communication terminal 1200. The processing unit may be connected to a memory (not shown) that is similar to the memory 1006 discussed in FIG. 10. The memory may include transitory and/or non-transitory storage media configured to store data, and/or logic, code, and/or program instructions executable by the processing unit for performing any suitable embodiment of the methods described herein.

The systems and methods described herein can be applied to communicate with a wide variety of movable objects. As previously mentioned, any description herein of a UAV may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 5 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of an movable object weight to a load weight may be greater than, less than, or equal to about 1:1. In some instances, a ratio of an movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of an movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
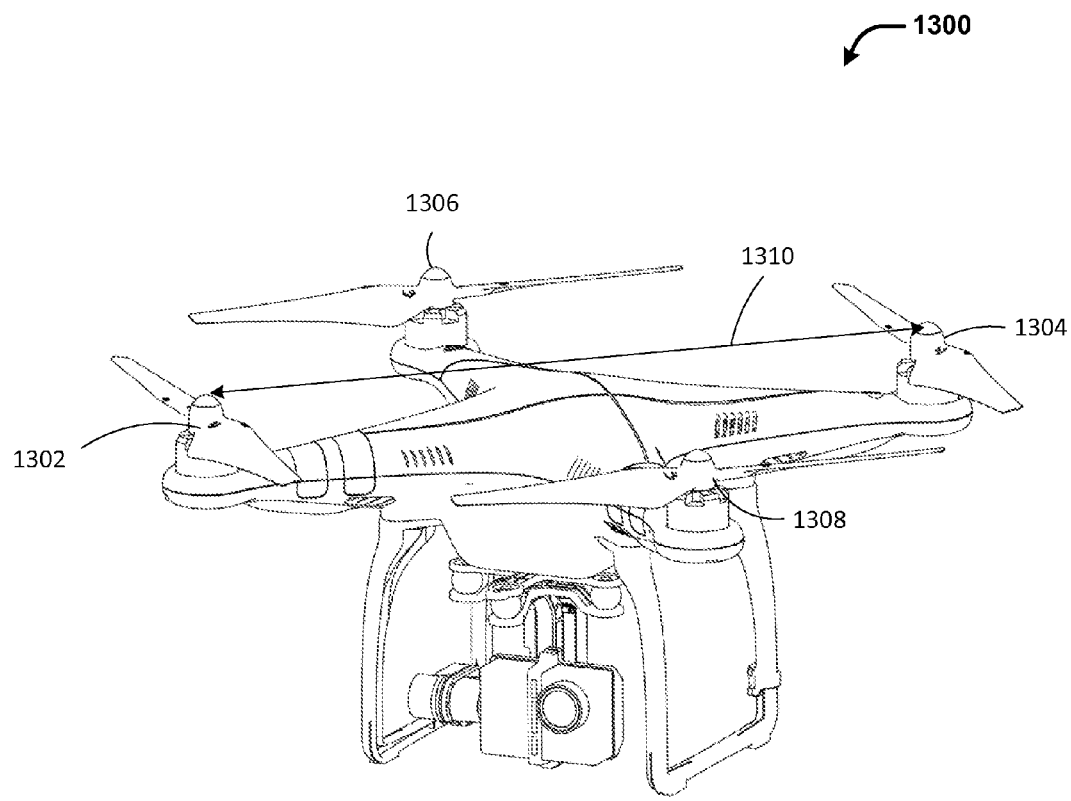
FIG. 13 illustrates an unmanned aerial vehicle (UAV), in accordance with some embodiments.

FIG. 13 illustrates an unmanned aerial vehicle (UAV) 1300, in accordance with embodiments of the present invention. The UAV may be an example of a movable object as described herein. The UAV 1300 can include a propulsion system having four rotors 1302, 1304, 1306, and 1308. Any number of rotors may be provided (e.g., one, two, three, four, five, six, or more). The rotors can be embodiments of the self-tightening rotors described elsewhere herein. The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1310. For example, the length 1310 can be less than or equal to 2 m, or less than equal to 5 m. In some embodiments, the length 1310 can be within a range from 40 cm to 7 m, from 70 cm to 2 m, or from 5 cm to 5 m. Any description herein of a UAV may apply to a movable object, such as a movable object of a different type, and vice versa.

In some embodiments, the movable object can be configured to carry a load 1312. The load can include one or more of passengers, cargo, equipment, instruments, and the like. The load can be provided within a housing. The housing may be separate from a housing of the movable object, or be part of a housing for an movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. For example, the payload may be an image capturing device. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a control device. The control device can be a remote control device at a location distant from the movable object, carrier, and/or payload. The control device can be disposed on or affixed to a support platform. For example, the control device can include one or more computing devices in base station. Alternatively, the control device can be a handheld or wearable device. For example, the control device can include a smartphone, tablet, laptop, computer, glasses, gloves, helmet, microphone, or suitable combinations thereof. The control device can include a user interface, such as a keyboard, mouse, joystick, touchscreen, or display. Any suitable user input can be used to interact with the control device, such as manually entered commands, voice control, gesture control, or position control (e.g., via a movement, location or tilt of the control device).

The control device can be used to control any suitable state of the movable object, carrier, and/or payload. For example, the control device can be used to control the position and/or orientation of the movable object, carrier, and/or payload relative to a fixed reference from and/or to each other. In some embodiments, the control device can be used to control individual elements of the movable object, carrier, and/or payload, such as the actuation assembly of the carrier, a sensor of the payload, or an emitter of the payload. The control device can include a wireless communication device adapted to communicate with one or more of the movable object, carrier, or payload.

The control device can include a suitable display unit for viewing information of the movable object, carrier, and/or payload. For example, the control device can be configured to display information of the movable object, carrier, and/or payload with respect to position, translational velocity, translational acceleration, orientation, angular velocity, angular acceleration, or any suitable combinations thereof. In some embodiments, the control device can display information provided by the payload, such as data provided by a functional payload (e.g., images recorded by a camera or other image capturing device).

Optionally, the same control device may both control the movable object, carrier, and/or payload, or a state of the movable object, carrier and/or payload, as well as receive and/or display information from the movable object, carrier and/or payload. For example, a control device may control the positioning of the payload relative to an environment, while displaying image data captured by the payload, or information about the position of the payload. Alternatively, different control devices may be used for different functions. For example, a first control device may control movement or a state of the movable object, carrier, and/or payload while a second control device may receive and/or display information from the movable object, carrier, and/or payload. For example, a first control device may be used to control the positioning of the payload relative to an environment while a second control device displays image data captured by the payload. Various communication modes may be utilized between a movable object and an integrated control device that both controls the movable object and receives data, or between the movable object and multiple control devices that both control the movable object and receives data. For example, at least two different communication modes may be formed between the movable object and the control device that both controls the movable object and receives data from the movable object.

Figure 14:
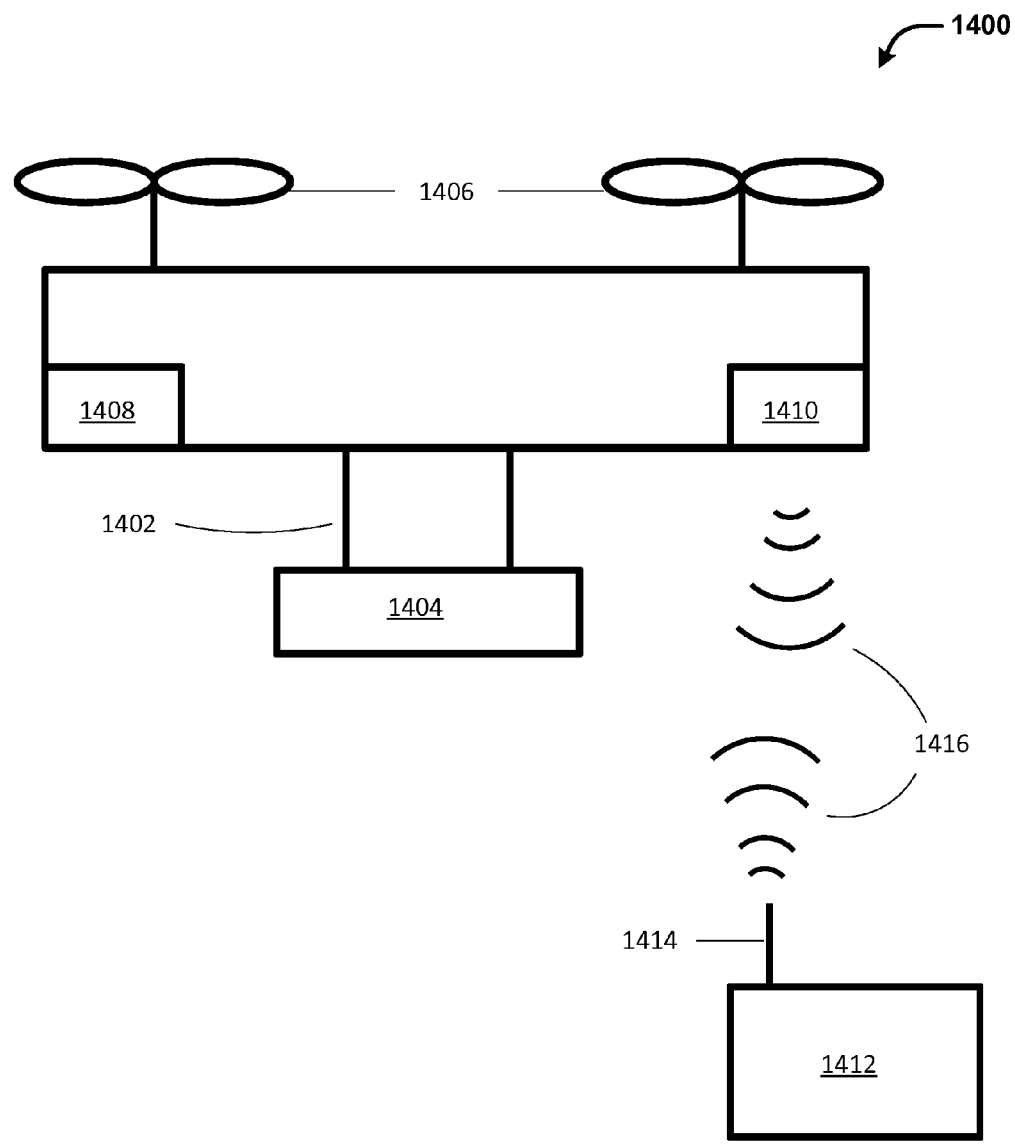
FIG. 14 illustrates a movable object and a control device, in accordance with embodiments.

FIG. 14 illustrates a movable object 1400 and a control device 1412, in accordance with embodiments. The movable object and the control device can be examples of the communication terminals discussed herein. The movable object 1400 can include a carrier 1402 and a payload 1404. Although the movable object 1400 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1404 may be provided on the movable object 1400 without requiring the carrier 1402. The movable object 1400 may include propulsion mechanisms 1406, a sensing system 1408, and a communication system 1410.

The propulsion mechanisms 1406 can include one or more of rotors, propellers, blades, engines, motors, wheels, axles, magnets, or nozzles, as previously described. For example, the propulsion mechanisms 1406 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1406 can be mounted on the movable object 1400 using any suitable means, such as a support element (e.g., a drive shaft) as described elsewhere herein. The propulsion mechanisms 1406 can be mounted on any suitable portion of the movable object 1400, such on the top, bottom, front, back, sides, or suitable combinations thereof.

In some embodiments, the propulsion mechanisms 1406 can enable the movable object 1400 to take off vertically from a surface or land vertically on a surface without requiring any horizontal movement of the movable object 1400 (e.g., without traveling down a runway). Optionally, the propulsion mechanisms 1406 can be operable to permit the movable object 1400 to hover in the air at a specified position and/or orientation. One or more of the propulsion mechanisms 1400 may be controlled independently of the other propulsion mechanisms. Alternatively, the propulsion mechanisms 1400 can be configured to be controlled simultaneously. For example, the movable object 1400 can have multiple horizontally oriented rotors that can provide lift and/or thrust to the movable object. The multiple horizontally oriented rotors can be actuated to provide vertical takeoff, vertical landing, and hovering capabilities to the movable object 1400. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1400 (e.g., with respect to up to three degrees of translation and up to three degrees of rotation).

The sensing system 1408 can include one or more sensors that may sense the spatial disposition, velocity, and/or acceleration of the movable object 1400 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1408 can be used to control the spatial disposition, velocity, and/or orientation of the movable object 1400 (e.g., using a suitable processing unit and/or control module, as described below). Alternatively, the sensing system 1408 can be used to provide data regarding the environment surrounding the movable object, such as weather conditions, proximity to potential obstacles, location of geographical features, location of manmade structures, and the like.

The communication system 1410 enables communication with control device 1412 having a communication system 1414 via wireless signals 1416. The communication systems 1410, 1414 may include any number of transmitters, receivers, and/or transceivers suitable for wireless communication. The communication may be one-way communication, such that data can be transmitted in only one direction. For example, one-way communication may involve only the movable object 1400 transmitting data to the control device 1412, or vice-versa. The data may be transmitted from one or more transmitters of the communication system 1410 to one or more receivers of the communication system 1412, or vice-versa. Alternatively, the communication may be two-way communication, such that data can be transmitted in both directions between the movable object 1400 and the control device 1412. The two-way communication can involve transmitting data from one or more transmitters of the communication system 1410 to one or more receivers of the communication system 1414, and vice-versa.

In some embodiments, the control device 1412 can provide control data to one or more of the movable object 1400, carrier 1402, and payload 1404 and receive information from one or more of the movable object 1400, carrier 1402, and payload 1404 (e.g., position and/or motion information of the movable object, carrier or payload; data sensed by the payload such as image data captured by a payload camera). In some instances, control data from the control device may include instructions for relative positions, movements, actuations, or controls of the movable object, carrier and/or payload. For example, the control data may result in a modification of the location and/or orientation of the movable object (e.g., via control of the propulsion mechanisms 1406), or a movement of the payload with respect to the movable object (e.g., via control of the carrier 1402). The control data from the control device may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1408 or of the payload 1404). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the control device 1412 can be configured to control a state of one or more of the movable object 1400, carrier 1402, or payload 1404. Alternatively or in combination, the carrier 1402 and payload 1404 can also each include a communication module configured to communicate with control device 1412, such that the control device can communicate with and control each of the movable object 1400, carrier 1402, and payload 1404 independently.

In some embodiments, the movable object 1400 can be configured to communicate with another remote device in addition to the control device 1412, or instead of the control device 1412. The control device 1412 may also be configured to communicate with another remote device as well as the movable object 1400. For example, the movable object 1400 and/or control device 1412 may communicate with another movable object, or a carrier or payload of another movable object. When desired, the remote device may be a second control device or other computing device (e.g., computer, laptop, tablet, smartphone, or other mobile device). The remote device can be configured to transmit data to the movable object 1400, receive data from the movable object 1400, transmit data to the control device 1412, and/or receive data from the control device 1412. Optionally, the remote device can be connected to the Internet or other telecommunications network, such that data received from the movable object 1400 and/or control device 1412 can be uploaded to a website or server.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for wireless communication between a remote controller and an unmanned aerial vehicle (UAV) using a plurality of cyclically repeating time division multiplexing (TDM) frames, each comprising a plurality of subframes, the method comprising:
   (a) transferring, at a first data bandwidth, uplink data from the remote controller to the UAV while using a first subset of the plurality of subframes, the uplink data (1) encoded using a first coding scheme and (2) including control data for controlling flight of the UAV;
   (b) transferring, at a second data bandwidth that is different than the first data bandwidth, downlink data from the UAV to the remote controller while using a second subset of the plurality of subframes, the downlink data encoded using a second coding scheme, the second coding scheme being different than the first coding scheme;
   (c) prior to performing (a) or (b), selecting a working frequency channel from a plurality of frequency channels by measuring one or more quality characteristics associated with each of the plurality of frequency channels; and
   (d) prior to or concurrent with performing (a) or (b), synchronizing the remote controller and the UAV by transmitting timing information relating to the transfer of the uplink data or the transfer of the downlink data between the controller and the UAV.

2. The method of claim 1, wherein the downlink data includes image data acquired by a visual sensor associated with the UAV.

3. The method of claim 1, wherein the second coding scheme is more efficient than the first coding scheme.

4. The method of claim 3, wherein the second coding scheme includes Low Density Parity Check Code (LDPC).

5. The method of claim 1, further comprising, in response to determining that transfer of the downlink data is not successful, re-transferring the downlink data from the UAV to the remote controller.

6. The method of claim 1, further comprising, in response to determining that transfer of the uplink data is not successful, allowing only the transfer of the uplink data.

7. The method of claim 1, further comprising dynamically changing the first coding scheme or the second coding scheme based at least in part on one or more channel conditions.

8. The method of claim 1, wherein the downlink data is transferred using the selected working frequency channel.

9. The method of claim 8, wherein the uplink data include synchronization information useful for synchronizing the remote controller and the UAV.

10. The method of claim 8, wherein the one or more quality characteristics include at least one of noise, interference, signal-to-noise ratio (SNR), bit error rate, or fading rate.

11. A method for wireless communication between a remote controller and a UAV using a plurality of cyclically repeating time division multiplexing (TDM) frames, each comprising a plurality of subframes, the method comprising:
   (a) transferring, at a first data bandwidth, uplink data from the remote controller to the UAV while using a first subset of the plurality of subframes, the uplink data (1) modulated using a first modulation scheme and (2) including control data for controlling flight of the UAV; and
   (b) transferring, at a second data bandwidth that is different than the first data bandwidth, downlink data from the UAV to the remote controller while using a second subset of the plurality of subframes, the downlink data modulated using a second modulation scheme, the second modulation scheme being different than the first modulation scheme;
   (c) prior to performing (a) or (b), selecting a working frequency channel from a plurality of frequency channels by measuring one or more quality characteristics associated with each of the plurality of frequency channels; and
   (d) prior to or concurrent with performing (a) or (b), synchronizing the remote controller and the UAV by transmitting timing information relating to the transfer of the uplink data or the transfer of the downlink data between the controller and the UAV.

12. The method of claim 11, wherein the uplink data comprising synchronization information useful for synchronizing operations of the remote controller and the UAV.

13. The method of claim 11, wherein the first modulation scheme includes at least one of Direct Sequence Spread Spectrum (DSSS), Frequency Hopping Spread Spectrum (FHSS), or Frequency Shift Keying (FSK).

14. The method of claim 11, wherein the second modulation scheme includes Quadrature Amplitude Modulation (QAM).

15. The method of claim 11, wherein the second modulation scheme is higher-order than the first modulation scheme.

16. The method of claim 11, further comprising dynamically changing the first modulation scheme or the second modulation scheme based at least in part on one or more channel conditions.

17. A data communication system, comprising:
- a remote controller comprising a uplink transmitter and a downlink receiver; and
- a UAV comprising an uplink receiver and a downlink transmitter, wherein:
- the uplink transmitter is configured to transmit uplink data to the UAV in a first time slot;
- the downlink receiver is configured to measure, in a second time slot, channel quality associated with one or more channels to select a working frequency channel and to receive, using the working frequency channel, downlink data provided by the second terminal in a third time slot;
- the uplink receiver is configured to receive the uplink data in the first time slot; and
- the downlink transmitter is configured to transmit, using the working frequency channel, the downlink data in the third time slot,
- wherein a working frequency channel is selected from a plurality of frequency channels by measuring one or more quality characteristics associated with each of the plurality of frequency channels, and
- wherein the remote controller and the UAV are synchronized by transmitting timing information relating to the transfer of the uplink data or the transfer of the downlink data between the controller and the UAV.

18. The system of claim 17, wherein the first time slot, the second time slot and the third time slot each includes one or more time division multiplexing (TDM) subframes.

19. The method of claim 1, further comprising re-establishing the wireless communication between the remote controller and the UAV when the uplink data from the remote controller is not successfully received by the UAV.

20. The method of claim 11, further comprising re-establishing the wireless communication between the remote controller and the UAV when the uplink data from the remote controller is not successfully received by the UAV.

21. The method of claim 1, wherein the number of subframes in the second subset is greater than the number of subframes in the first subset.

22. The method of claim 11, wherein the number of subframes in the second subset is greater than the number of subframes in the first subset.

23. The method of claim 1, wherein the uplink data is transferred using a first frequency channel with a first channel bandwidth and the downlink data is transferred using a second frequency channel with a second channel bandwidth that is wider than the first bandwidth.

24. The method of claim 11, wherein the uplink data is transferred using a first frequency channel with a first channel bandwidth and the downlink data is transferred using a second frequency channel with a second channel bandwidth that is wider than the first bandwidth.

* * * * *